(12) United States Patent
Zhao et al.

(10) Patent No.: US 12,160,744 B2
(45) Date of Patent: Dec. 3, 2024

(54) USER PLANE INTEGRITY PROTECTION METHOD AND APPARATUS, AND DEVICE

(71) Applicant: Huawei Technologies Co., Ltd., Shenzhen (CN)

(72) Inventors: Xuwen Zhao, Shenzhen (CN); Li Hu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 802 days.

(21) Appl. No.: 17/141,688

(22) Filed: Jan. 5, 2021

(65) Prior Publication Data
US 2021/0127272 A1    Apr. 29, 2021

Related U.S. Application Data

(63) Continuation of application No. PCT/CN2019/095177, filed on Jul. 9, 2019.

(30) Foreign Application Priority Data

Aug. 10, 2018    (CN) .......................... 201810910222.5

(51) Int. Cl.
| | |
|---|---|
| *H04W 12/08* | (2021.01) |
| *H04W 8/08* | (2009.01) |
| *H04W 12/106* | (2021.01) |
| *H04W 36/00* | (2009.01) |
| *H04W 76/25* | (2018.01) |
| *H04W 76/27* | (2018.01) |

(52) U.S. Cl.
CPC ........... *H04W 12/106* (2021.01); *H04W 8/08* (2013.01); *H04W 36/0038* (2013.01); *H04W 76/25* (2018.02); *H04W 76/27* (2018.02)

(58) Field of Classification Search
CPC ... H04W 36/0038; H04W 8/08; H04W 76/27; H04W 76/25; H04W 12/106
USPC ............................................................ 726/2
See application file for complete search history.

(56) References Cited

U.S. PATENT DOCUMENTS

| | | | |
|---|---|---|---|
| 2012/0039472 A1 | 2/2012 | Liu et al. | |
| 2012/0315878 A1 | 12/2012 | Deng | |
| 2015/0359094 A1 | 12/2015 | Nitzan | |

(Continued)

FOREIGN PATENT DOCUMENTS

| | | | |
|---|---|---|---|
| CN | 101702818 A | 5/2010 | |
| CN | 102149088 A | 8/2011 | |

(Continued)

OTHER PUBLICATIONS

Telecom Italia, et al., "Enhanced security support for S2c," 3GPP TSG-SA2 Meeting #79, S2-103053, Kyoto, Japan, May 10-14, 2010, 5 pages.

(Continued)

*Primary Examiner* — Josnel Jeudy
(74) *Attorney, Agent, or Firm* — Conley Rose, P.C.

(57) ABSTRACT

A user plane integrity protection method sending, by a user equipment (UE), user plane integrity protection information of the UE to a first base station, wherein the user plane integrity protection information indicates whether the UE supports a user plane integrity protection, and enabling the user plane integrity protection according to a user plane integrity protection algorithm when the UE supports the user plane integrity protection.

20 Claims, 22 Drawing Sheets

(56) References Cited

U.S. PATENT DOCUMENTS

| | | |
|---|---|---|
| 2015/0365822 A1 | 12/2015 | Sharma |
| 2017/0005795 A1 | 1/2017 | Gan et al. |
| 2017/0251013 A1 | 8/2017 | Kirti et al. |
| 2019/0313479 A1* | 10/2019 | Myhre .................. H04W 76/11 |
| 2019/0349340 A1 | 11/2019 | Zhang et al. |
| 2019/0349406 A1 | 11/2019 | Pan et al. |
| 2019/0394778 A1 | 12/2019 | Kanazawa et al. |
| 2020/0128398 A1 | 4/2020 | Wifvesson et al. |
| 2020/0267800 A1* | 8/2020 | Kim ...................... H04W 76/38 |
| 2021/0306848 A1 | 9/2021 | Chen et al. |
| 2022/0116843 A1* | 4/2022 | Velev ..................... H04W 4/50 |
| 2022/0330028 A1* | 10/2022 | Suh ....................... H04W 60/04 |

FOREIGN PATENT DOCUMENTS

| | | | |
|---|---|---|---|
| CN | 102264064 A | 11/2011 | |
| CN | 102413461 A | 4/2012 | |
| CN | 102487507 A | 6/2012 | |
| CN | 104936173 A | 9/2015 | |
| CN | 104937694 A | 9/2015 | |
| CN | 106507348 A | 3/2017 | |
| CN | 108347410 A | 7/2018 | |
| CN | 110431867 B * | 8/2021 | .......... H04W 12/041 |
| JP | 2020536408 A | 12/2020 | |
| JP | 2021531678 A | 11/2021 | |
| KR | 20110066958 A | 6/2011 | |
| KR | 20130018299 A | 2/2013 | |
| KR | 20180049211 A | 5/2018 | |
| WO | WO-2011054288 A1 * | 5/2011 | ............ H04W 12/04 |
| WO | 2011130682 A2 | 10/2011 | |
| WO | 2017060245 A1 | 4/2017 | |
| WO | 2018137255 A1 | 8/2018 | |
| WO | WO-2018138379 A1 * | 8/2018 | ............ H04L 29/06 |
| WO | 2019068644 A1 | 4/2019 | |
| WO | 2019244793 A1 | 12/2019 | |

OTHER PUBLICATIONS

S3-161667 Huawei, Hisilicon, "Clarification on Solution#1.1 and #1.3," 3GPP TSG SA WG3 (Security) Meeting #85, Nov. 7-11, 2016, Santa Cruz de Tenerife (Spain), 2 pages.

S3-170231 Ericsson, "New KI Supporting integrity protection of UP",3GPP TSG-SA WG3 Meeting #86, Sophia Antipolis, France, Feb. 6- 10, 2017, total 2 pages.

Qualcomm Incorporated, et al., "TP for usage of user plane integrity protection," 3GPP TSG-RAN WG2 Meeting #100, R2-1712468, Reno, USA, Nov. 27-Dec. 1, 2017, 2 pages.

Ericsson, "Clause 8 (open issues in AS security)—Disc," 3GPP TSG SA WG3 (Security) Meeting #89, S3-173084, Nov. 27-Dec. 1, 2017, Reno, 3 pages.

CATT, "Proposal for UP integrity protection activation," 3GPP TSG SA WG3 (Security) Meeting #90, S3-180056, Jan. 22-26, 2018, Gothenburg (Sweden), 2 pages.

Qualcomm Incorporated, "User plane integrity protection granularity," 3GPP TSG SA WG3 (Security) Meeting #90, S3-180256, Jan. 22-26, 2018, Gothenburg (Sweden), 1 page.

Jian-Lin, S., et al., "The Access Layer of Encryption and Integrity Protection in LTE System," Guangxi Communication Technology, 2020, With an English Abstract, 5 pages.

* cited by examiner

USER PLANE INTEGRITY PROTECTION METHOD AND APPARATUS, AND DEVICE

CROSS-REFERENCE TO RELATED APPLICATIONS

This application is a continuation of International Patent Application No. PCT/CN2019/095177 filed on Jul. 9, 2019, which claims priority to Chinese Patent Application No. 201810910222.5 filed on Aug. 10, 2018. The disclosures of the aforementioned applications are hereby incorporated by reference in their entireties.

TECHNICAL FIELD

This application relates to the field of communications technologies, and in particular, to a user plane integrity protection method and apparatus, and a device.

BACKGROUND

Currently, in the 4th generation mobile communication technology (4G), a radio air interface between a base station and user equipment (UE) supports only control plane integrity protection, but does not support user plane integrity protection. That is, in some other approaches, there is no user plane integrity protection procedure on the radio air interface between the base station and the UE.

SUMMARY

This application provides a user plane integrity protection method and apparatus, and a device, to implement a user plane integrity protection procedure on a radio air interface between a base station and UE.

According to a first aspect, this application provides a user plane integrity protection method. The method includes a first base station obtains user plane integrity protection information of UE. If the first base station supports user plane integrity protection and the user plane integrity protection information indicates that the UE supports user plane integrity protection, the first base station enables user plane integrity protection according to a user plane integrity protection algorithm.

In the foregoing process, the first base station may obtain the user plane integrity protection information of the UE, and determine, based on the user plane integrity protection information, whether the UE supports user plane integrity protection. When the first base station supports user plane integrity protection and determines that the UE supports user plane integrity protection, the first base station enables user plane integrity protection according to the user plane integrity protection algorithm, and the UE also enables user plane integrity protection according to the user plane integrity protection algorithm. That is, the first base station may negotiate with the UE, and when both the first base station and the UE support user plane integrity protection, the first base station and the UE enable user plane integrity protection according to the same user plane integrity protection algorithm, to implement a user plane integrity protection procedure on a radio air interface between the first base station and the UE.

In a possible implementation, the first base station sends first information to the UE. The first information includes the user plane integrity protection algorithm. Alternatively, the first information is used to indicate the UE to enable user plane integrity protection according to a preset integrity protection algorithm.

In another possible implementation, the preset integrity protection algorithm is the same as a control plane integrity protection algorithm of the first base station and the UE.

In another possible implementation, that the first base station obtains the user plane integrity protection information of the UE includes the following.

The first base station receives an initial context request message sent by a mobility management entity. The initial context request message includes the user plane integrity protection information of the UE.

The user plane integrity protection information of the UE is carried in the initial context request message such that signaling overheads can be reduced.

In another possible implementation, that the first base station sends the first information to the UE includes the following.

The first base station sends an access stratum security mode command message to the UE. The access stratum security mode command message includes the first information.

The first information is carried in the access stratum security mode command message such that signaling overheads can be reduced.

In another possible implementation, that the first base station obtains the user plane integrity protection information of the UE includes the following.

The first base station receives a first handover request message sent by a second base station. The first handover request message includes the user plane integrity protection information of the UE. The first base station is a base station to which the UE is to be handed over, and the second base station is a base station accessed by the UE.

The user plane integrity protection information of the UE is carried in the first handover request message such that signaling overheads can be reduced.

In another possible implementation, that the first base station sends the first information to the UE includes the following.

The first base station sends a first handover response message to the second base station. The first handover response message includes the first information, and the first handover response message is used to indicate the second base station to send a Radio Resource Control (RRC) connection reconfiguration message including the first information to the UE.

The first information is carried in the first handover response message such that signaling overheads can be reduced.

In another possible implementation, that the first base station obtains the user plane integrity protection information of the UE includes the following.

The first base station receives a second handover request message sent by a first mobility management entity. The second handover request message includes the user plane integrity protection information.

The user plane integrity protection information is carried in the second handover request message such that signaling overheads can be reduced.

In another possible implementation, that the first base station sends the first information to the UE includes the following.

The first base station sends a second handover response message to a first mobility management entity. The second handover response message includes the first information, and the second handover response message is used to indicate the first mobility management entity to send a forward relocation response message including the first information to a second mobility management entity. The forward relocation response message is used to enable the second mobility management entity to send a first handover command message including the first information to a third base station. The first handover command message is used to indicate the third base station to send a second handover command message including the first information to the UE.

The first base station is a base station to which the UE is to be handed over, and the third base station is a base station accessed by the UE.

The first information is carried in the second handover response message such that signaling overheads can be reduced.

In another possible implementation, that the first base station obtains the user plane integrity protection information of the UE includes the following.

The first base station receives a bearer setup request message sent by a mobility management entity. The bearer setup request message includes the user plane integrity protection information of the UE.

The user plane integrity protection information is carried in the bearer setup request message such that signaling overheads can be reduced.

In another possible implementation, that the first base station obtains the user plane integrity protection information of the UE includes the following.

The first base station receives an access stratum security mode complete message sent by the UE. The access stratum security mode complete message includes the user plane integrity protection information of the UE.

The user plane integrity protection information is carried in the access stratum security mode complete message such that signaling overheads can be reduced.

In another possible implementation, that the first base station sends the first information to the UE includes the following.

The first base station sends an RRC connection reconfiguration message to the UE. The RRC connection reconfiguration message includes the first information.

The first information is carried in the RRC connection reconfiguration message such that signaling overheads can be reduced.

In another possible implementation, that the first base station obtains the user plane integrity protection information of the UE includes the following.

The first base station receives a base station addition request message sent by a fourth base station. The base station addition request message includes the user plane integrity protection information. The base station addition request message is sent by the fourth base station after the fourth base station receives an RRC connection setup message that includes the user plane integrity protection information and that is sent by the UE.

The first base station is a secondary base station connected to the UE, and the fourth base station is a master base station connected to the UE.

The user plane integrity protection information is carried in the base station addition request message such that signaling overheads can be reduced.

In another possible implementation, that the first base station sends the first information to the UE includes the following.

The first base station sends a base station addition response message to the fourth base station. The base station addition response message includes the first information, and the base station addition response message is used to enable a second base station to send an RRC connection reconfiguration message including the first information to the UE.

The first information is carried in the base station addition response message such that signaling overheads can be reduced.

In another possible implementation, that the first base station obtains the user plane integrity protection information of the UE includes the following.

The first base station receives an RRC connection reconfiguration complete message sent by the UE. The RRC connection reconfiguration complete message includes the user plane integrity protection information of the UE.

The user plane integrity protection information is carried in the RRC connection reconfiguration complete message such that signaling overheads can be reduced.

In another possible implementation, the method further includes If the first base station does not support user plane integrity protection and the user plane integrity protection information indicates that the UE supports user plane integrity protection, the first base station sends first indication information to the UE. The first indication information is used to indicate the UE not to enable user plane integrity protection.

According to a second aspect, this application provides a user plane integrity protection method, and includes the following.

UE sends user plane integrity protection information of the UE to a first base station. The user plane integrity protection information is used to indicate whether the UE supports plane integrity protection.

When the UE supports user plane integrity protection, the UE enables user plane integrity protection according to a user plane integrity protection algorithm.

In the foregoing process, the first base station may obtain the user plane integrity protection information of the UE, and determine, based on the user plane integrity protection information, whether the UE supports user plane integrity protection. When the first base station supports user plane integrity protection and determines that the UE supports user plane integrity protection, the first base station enables user plane integrity protection according to the user plane integrity protection algorithm, and the UE also enables user plane integrity protection according to the user plane integrity protection algorithm. That is, the first base station may negotiate with the UE, and when both the first base station and the UE support user plane integrity protection, the first base station and the UE enable user plane integrity protection according to the same user plane integrity protection algorithm, to implement a user plane integrity protection procedure on a radio air interface between the first base station and the UE.

In a possible implementation, before the UE enables user plane integrity protection according to the user plane integrity protection algorithm, the method further includes the following.

The UE receives first information sent by the first base station.

The first information includes the user plane integrity information protection algorithm, or the first information is used to indicate the UE to enable user plane integrity protection according to a preset integrity protection algorithm.

In another possible implementation, the preset integrity protection algorithm is the same as a control plane integrity protection algorithm of the first base station and the UE.

In another possible implementation, that the UE sends the user plane integrity protection information of the UE to the first base station includes the following.

The UE sends a non-access stratum (NAS) message to a mobility management entity. The NAS message includes the user plane integrity protection information, and the NAS message is used to indicate the mobility management entity to send an initial context request message including the user plane integrity protection information to the first base station.

In another possible implementation, that the UE receives the first information sent by the first base station includes the following.

The UE receives an access stratum security mode command message sent by the first base station. The access stratum security mode command message includes the first information.

In another possible implementation, that the UE sends the user plane integrity protection information of the UE to the first base station includes the following.

The UE sends a public data network (PDN) connection request message to a mobility management entity. The PDN connection request message includes the user plane integrity information, and the PDN connection request message is used to indicate the mobility management entity to send a bearer setup request message including the user plane integrity protection information to the first base station.

In another possible implementation, that the UE sends the user plane integrity protection information of the UE to the first base station includes the following.

The UE sends an access stratum security mode complete message to the first base station. The access stratum security mode complete message includes the user plane integrity protection information.

In another possible implementation, that the UE receives the first information sent by the first base station includes the following.

The UE receives an RRC connection reconfiguration message sent by the first base station. The RRC connection reconfiguration message includes the first information.

In another possible implementation, that the UE sends the user plane integrity protection information of the UE to the first base station includes the following.

The UE sends an RRC connection setup message to a fourth base station. The RRC connection setup message includes the user plane integrity protection information. The user plane integrity protection information is used to enable the fourth base station to send a base station addition request message including the user plane integrity protection information to the first base station.

The first base station is a secondary base station connected to the UE, and the fourth base station is a master base station connected to the UE.

In another possible implementation, that the UE receives the first information sent by the first base station includes the following.

The UE receives an RRC connection reconfiguration message sent by the fourth base station. The RRC connection reconfiguration message includes the first information, and the RRC connection reconfiguration message is sent by the fourth base station to the UE after the fourth base station receives a base station addition request response message sent by the first base station. The base station addition request response message includes the first information.

In another possible implementation, that the UE sends the user plane integrity protection information of the UE to the first base station includes the following.

The UE sends the user plane integrity protection information to a second base station. The user plane integrity protection information is used to enable the second base station to send a handover request message including the user plane integrity protection information to the first base station before the UE is handed over from the second base station to the first base station.

In another possible implementation, that the UE receives the first information sent by the first base station includes the following.

The UE receives an RRC connection reconfiguration message sent by the second base station. The RRC connection reconfiguration message includes the first information, and the RRC connection reconfiguration message is sent by the second base station to the UE after the second base station receives a handover response message sent by the first base station. The handover response message includes the first information.

In another possible implementation, that the UE sends the user plane integrity protection information of the UE to the first base station includes the following.

The UE sends the user plane integrity protection information to a third base station. The user plane integrity protection information is used to enable the third base station to send a handover request message including the user plane integrity protection information to a second mobility management entity before the UE is handed over from the third base station to the first base station. The handover request message is used to enable the second mobility management entity to send a forward relocation response message including the user plane integrity protection information to the first base station.

The first base station is a base station to which the UE is to be handed over, and the third base station is a base station accessed by the UE. A first mobility management entity is a mobility management entity connected to the first base station, and the second mobility management entity is a mobility management entity connected to the third base station.

In another possible implementation, that the UE receives the first information sent by the first base station includes the following.

The UE receives a handover command message sent by the third base station. The handover command message includes the first information. The handover command message is sent by the third base station to the UE after the third base station receives the handover command message sent by the second mobility management entity. The handover command message includes the first information.

In another possible implementation, the user plane integrity protection algorithm is a preset integrity protection algorithm.

In another possible implementation, the preset integrity protection algorithm is the same as a control plane integrity protection algorithm of the first base station and the UE.

In a possible implementation, after the UE enables user plane integrity protection according to the user plane integrity protection algorithm, the method further includes the following.

The UE receives an RRC connection reconfiguration message sent by the first base station. The RRC connection reconfiguration message includes first indication information, and the first indication information indicates the UE not to enable user plane integrity protection.

The UE disables user plane integrity protection based on the first indication information.

According to a third aspect, this application provides a user plane integrity protection method, and includes the following.

A first base station sends first indication information and an identifier of a bearer to UE. The first indication information is used to indicate the UE to enable user plane integrity protection for the bearer according to a preset integrity protection algorithm. The bearer is used to transmit user plane data that matches first flow matching information corresponding to the bearer.

The first base station obtains user plane information of the UE. The user plane information is integrity protected by the UE according to the preset integrity protection algorithm.

In the foregoing process, when the first base station determines that user plane integrity protection corresponding to a bearer needs to be enabled, the first base station sends first indication information and a bearer identifier of the bearer to the UE, to indicate the UE to enable, according to a preset user plane integrity protection algorithm, user plane integrity protection corresponding to the bearer. When the UE supports user plane integrity protection, the UE enables user plane integrity protection corresponding to the bearer. The first base station may further obtain user plane integrity protection information of the UE, to determine whether the UE supports user plane integrity protection. When determining that the UE also supports user plane integrity protection, the first base station enables user plane integrity protection corresponding to the bearer. It can be learned from the foregoing that, the first base station may negotiate with the UE, and when both the first base station and the UE support user plane integrity protection, the first base station and the UE enable user plane integrity protection according to the same user plane integrity protection algorithm, to implement a user plane integrity protection procedure on a radio air interface between the first base station and the UE.

In a possible implementation, after the first base station obtains the user plane information of the UE, the method further includes the following.

The first base station performs integrity protection verification on the user plane information.

In another possible implementation, before the first base station sends the first indication information and the identifier of the bearer to the UE, the method further includes the following.

The first base station obtains a first parameter corresponding to the bearer.

The first base station sends the first indication information and the identifier of the bearer to the UE if the first parameter satisfies a preset rule.

In another possible implementation, the first parameter is used to identify the bearer.

That the first base station sends the first indication information and the identifier of the bearer to the UE if the first parameter satisfies the preset rule includes the following.

If the first parameter indicates a preset bearer, the first base station sends the first indication information and the identifier of the bearer to the UE.

In another possible implementation, after the first base station sends the first indication information and the identifier of the bearer to the UE, the method further includes the following.

The first base station obtains the user plane integrity protection information of the UE. The user plane integrity protection information is used to indicate whether the UE supports user plane integrity protection.

If the user plane integrity protection information indicates that the UE supports user plane integrity protection, the first base station enables, according to the preset integrity protection algorithm, user plane integrity protection corresponding to the bearer.

In another possible implementation, that the first base station obtains the first parameter includes the following.

The first base station receives a bearer setup request message from a mobility management network element. The bearer setup request message includes the first parameter and a NAS message. The NAS message includes the first flow matching information.

That the first base station sends the first indication information and the identifier of the bearer of to the UE includes the following.

The first base station sends an RRC connection reconfiguration message to the UE. The RRC connection reconfiguration message includes the first indication information, the identifier of the bearer, and the NAS message. The NAS message includes the first flow matching information.

In another possible implementation, that the first base station obtains the first parameter includes the following.

The first base station receives a handover request message from a second base station. The handover request message includes the first parameter.

That the first base station sends the first indication information and the identifier of the bearer of to the UE includes the following.

The first base station sends an RRC connection reconfiguration message to the UE through the second base station. The RRC connection reconfiguration message includes the first indication information and the identifier of the bearer.

In another possible implementation, that the first base station obtains the first parameter includes the following.

The first base station receives a context response message from a third base station. The obtained context response message includes the first parameter.

That the first base station sends the first indication information and the identifier of the bearer of to the UE includes the following.

The first base station sends an RRC connection resume message to the UE. The RRC connection resume message includes the first indication information and the identifier of the bearer.

In another possible implementation, the preset integrity protection algorithm is the same as a control plane integrity protection algorithm of the first base station and the UE.

According to a fourth aspect, this application provides a user plane integrity protection method, and includes the following.

UE receives first indication information and an identifier of a bearer that are sent by a first base station. The first indication information is used to indicate the UE to enable, according to a preset integrity protection algorithm, user plane integrity protection for a bearer corresponding to the identifier of the bearer. The bearer is used to transmit user plane data that matches first flow matching information corresponding to the bearer.

The UE enables, based on the first indication information and according to the preset integrity protection algorithm, user plane integrity protection corresponding to the bearer.

When user plane information to be sent by the UE matches the first flow matching information, the UE performs integrity protection on the user plane information according to the preset algorithm, and sends the user plane information on which user plane integrity protection has been performed to the first base station.

In the foregoing process, when the first base station determines that user plane integrity protection corresponding to a bearer needs to be enabled, the first base station sends first indication information and a bearer identifier of the bearer to the UE, to indicate the UE to enable, according to a preset user plane integrity protection algorithm, user plane integrity protection corresponding to the bearer. When the UE supports user plane integrity protection, the UE enables user plane integrity protection corresponding to the bearer. The first base station may further obtain user plane integrity protection information of the UE, to determine whether the UE supports user plane integrity protection. When determining that the UE also supports user plane integrity protection, the first base station enables user plane integrity protection corresponding to the bearer. It can be learned from the foregoing that, the first base station may negotiate with the UE, and when both the first base station and the UE support user plane integrity protection, the first base station and the UE enable user plane integrity protection according to the same user plane integrity protection algorithm, to implement a user plane integrity protection procedure on a radio air interface between the first base station and the UE.

In a possible implementation, that the UE enables, based on the first indication information and according to the preset algorithm, user plane integrity protection corresponding to the bearer includes the following.

When the UE supports user plane integrity protection, the UE enables, based on the first indication information and according to the preset algorithm, user plane integrity protection corresponding to the bearer.

In another possible implementation, after the UE receives the first indication information and the identifier of the bearer that are sent by the first base station, the method further includes the following.

The UE sends the user plane integrity protection information of the UE to the first base station. The user plane integrity protection information is used to indicate whether the UE supports user plane integrity protection.

In another possible implementation, before the UE receives the first indication information and the identifier of the bearer that are sent by the first base station, the method further includes the following.

When the user plane information to be sent by the UE satisfies a preset policy, the UE requests a core network control network element to set up the bearer.

In another possible implementation, the preset policy is generated by the UE when the UE obtains an Internet Protocol (IP) address of a domain name server.

In another possible implementation, the preset policy is used to indicate that the user plane information to be sent by the UE is a Domain Name Server (DNS) message.

In another possible implementation, that the UE receives the first indication information and the identifier of the bearer that are sent by the first base station includes the following.

The UE receives the first indication information, the identifier of the bearer, and a NAS message that are sent by the first base station. The NAS message includes the first flow matching information.

In another possible implementation, the first flow matching information is a flow filter template in which a target IP address is a preset IP address.

In another possible implementation, the preset algorithm is the same as a control plane integrity protection algorithm of the first base station and the UE.

According to a fifth aspect, this application provides a user plane integrity protection apparatus, including a receiving module and a processing module.

The receiving module is configured to obtain user plane integrity protection information of UE.

The processing module is configured to, when the first base station supports user plane integrity protection and the user plane integrity protection information indicates that the UE supports user plane integrity protection, enable user plane integrity protection according to a user plane integrity protection algorithm.

In a possible implementation, the apparatus further includes a sending module.

The sending module is configured to send first information to the UE.

The first information includes the user plane integrity protection algorithm, or the first information is used to indicate the UE to enable user plane integrity protection according to a preset integrity protection algorithm.

In another possible implementation, the preset integrity protection algorithm is the same as a control plane integrity protection algorithm of the first base station and the UE.

In another possible implementation, the receiving module is further configured to receive an initial context request message sent by a mobility management entity. The initial context request message includes the user plane integrity protection information of the UE.

In another possible implementation, the sending module is further configured to send an access stratum security mode command message to the UE. The access stratum security mode command message includes the first information.

In another possible implementation, the receiving module is further configured to receive a first handover request message sent by a second base station. The first handover request message includes the user plane integrity protection information of the UE. The first base station is a base station to which the UE is to be handed over, and the second base station is a base station accessed by the UE.

The sending module is further configured to send a first handover response message to the second base station. The first handover response message includes the first information, and the first handover response message is used to indicate the second base station to send a RRC connection reconfiguration message including the first information to the UE.

In another possible implementation, the receiving module is further configured to receive a second handover request message sent by a first mobility management entity. The second handover request message includes the user plane integrity protection information.

The sending module is further configured to send a second handover response message to the first mobility management entity. The second handover response message includes the first information, and the second handover response message is used to indicate the first mobility management entity to send a forward relocation response message including the first information to a second mobility management entity. The forward relocation response message is used to enable the second mobility management entity to send a first handover command message including the first information to a third base station. The first handover command message is used to indicate the third base station to send a second handover command message including the first information to the UE.

The first base station is a base station to which the UE is to be handed over, and the third base station is a base station accessed by the UE.

In another possible implementation, the receiving module is further configured to receive a bearer setup request message sent by a mobility management entity. The bearer setup request message includes the user plane integrity protection information of the UE.

In another possible implementation, the receiving module is further configured to receive an access stratum security mode complete message sent by the UE. The access stratum security mode complete message includes the user plane integrity protection information of the UE.

In another possible implementation, the sending module is further configured to send an RRC connection reconfiguration message to the UE. The RRC connection reconfiguration message includes the first information.

In another possible implementation, the receiving module is further configured to receive a base station addition request message sent by a fourth base station. The base station addition request message includes the user plane integrity protection information. The base station addition request message is sent by the fourth base station after the fourth base station receives an RRC connection setup message that includes the user plane integrity protection information and that is sent by the UE. The first base station is a secondary base station connected to the UE, and the fourth base station is a master base station connected to the UE.

The sending module is further configured to send a base station addition response message to the fourth base station. The base station addition response message includes the first information, and the base station addition response message is used to enable the second base station to send an RRC connection reconfiguration message including the first information to the UE.

In another possible implementation, the receiving module is further configured to receive an RRC connection reconfiguration complete message sent by the UE. The RRC connection reconfiguration complete message includes the user plane integrity protection information of the UE.

In another possible implementation, the apparatus further includes a sending module.

The sending module is configured to when the first base station does not support user plane integrity protection and the user plane integrity protection information indicates that the UE supports user plane integrity protection, send first indication information to the UE. The first indication information is used to indicate the UE not to enable user plane integrity protection.

According to a sixth aspect, this application provides a user plane integrity protection apparatus, including a sending module and a processing module.

The sending module is configured to send user plane integrity protection information of UE to a first base station. The user plane integrity protection information is used to indicate whether the UE supports plane integrity protection.

The processing module is configured to when the UE supports user plane integrity protection, enable user plane integrity protection according to a user plane integrity protection algorithm.

In a possible implementation, the apparatus further includes a receiving module.

The receiving module is configured to, before the processing module enables user plane integrity protection according to the user plane integrity protection algorithm, receive first information sent by the first base station.

The first information includes the user plane integrity information protection algorithm, or the first information is used to indicate the UE to enable user plane integrity protection according to a preset integrity protection algorithm.

In another possible implementation, the preset integrity protection algorithm is the same as a control plane integrity protection algorithm of the first base station and the UE.

In another possible implementation, the sending module is further configured to send a NAS message to a mobility management entity. The NAS message includes the user plane integrity protection information, and the NAS message is used to indicate the mobility management entity to send an initial context request message including the user plane integrity protection information to the first base station.

In another possible implementation, the receiving module is further configured to receive an access stratum security mode command message sent by the first base station. The access stratum security mode command message includes the first information.

In another possible implementation, the sending module is further configured to send a PDN connection request message to a mobility management entity. The PDN connection request message includes the user plane integrity information, and the PDN connection request message is used to indicate the mobility management entity to send a bearer setup request message including the user plane integrity protection information to the first base station.

In another possible implementation, the sending module is further configured to send an access stratum security mode complete message to the first base station. The access stratum security mode complete message includes the user plane integrity protection information.

In another possible implementation, the receiving module is further configured to receive an RRC connection reconfiguration message sent by the first base station. The RRC connection reconfiguration message includes the first information.

In another possible implementation, that the UE sends the user plane integrity protection information of the UE to the first base station includes the following.

The UE sends an RRC connection setup message to a fourth base station. The RRC connection setup message includes the user plane integrity protection information. The user plane integrity protection information is used to enable the fourth base station to send a base station addition request message including the user plane integrity protection information to the first base station.

The first base station is a secondary base station connected to the UE, and the fourth base station is a master base station connected to the UE.

In another possible implementation, that the UE receives the first information sent by the first base station includes the following.

The UE receives an RRC connection reconfiguration message sent by the fourth base station. The RRC connection reconfiguration message includes the first information, and the RRC connection reconfiguration message is sent by the fourth base station to the UE after the fourth base station receives a base station addition request response message sent by the first base station. The base station addition request response message includes the first information.

In another possible implementation, that the UE sends the user plane integrity protection information of the UE to the first base station includes the following.

The UE sends the user plane integrity protection information to a second base station. The user plane integrity protection information is used to enable the second base station to send a handover request message including the user plane integrity protection information to the first base station before the UE is handed over from the second base station to the first base station.

In another possible implementation, that the UE receives the first information sent by the first base station includes the following.

The UE receives an RRC connection reconfiguration message sent by the second base station. The RRC connection reconfiguration message includes the first information, and the RRC connection reconfiguration message is sent by the second base station to the UE after the second base station receives a handover response message sent by the first base station. The handover response message includes the first information.

In another possible implementation, that the UE sends the user plane integrity protection information of the UE to the first base station includes the following.

The UE sends the user plane integrity protection information to a third base station. The user plane integrity protection information is used to enable the third base station to send a handover request message including the user plane integrity protection information to the second mobility management entity before the UE is handed over from the third base station to the first base station. The handover request message is used to enable the second mobility management entity to send a forward relocation response message including the user plane integrity protection information to the first base station.

The first base station is a base station to which the UE is to be handed over, and the third base station is a base station accessed by the UE. The first mobility management entity is a mobility management entity connected to the first base station, and the second mobility management entity is a mobility management entity connected to the third base station.

In another possible implementation, that the UE receives the first information sent by the first base station includes the following.

The UE receives a handover command message sent by the third base station. The handover command message includes the first information. The handover command message is sent by the third base station to the UE after the third base station receives the handover command message sent by the second mobility management entity. The handover command message includes the first information.

In another possible implementation, the user plane integrity protection algorithm is a preset integrity protection algorithm.

In another possible implementation, the preset integrity protection algorithm is the same as a control plane integrity protection algorithm of the first base station and the UE.

In another possible implementation, the apparatus further includes a receiving module.

The receiving module is configured to, after the processing module enables user plane integrity protection according to the user plane integrity protection algorithm, receive an RRC connection reconfiguration message sent by the first base station. The RRC connection reconfiguration message includes first indication information, and the first indication information indicates the UE not to enable user plane integrity protection.

The processing module is further configured to disable user plane integrity protection based on the first indication information.

According to a seventh aspect, this application provides a user plane integrity protection apparatus, including a sending module and a receiving module.

The sending module is configured to send first indication information and an identifier of a bearer to UE. The first indication information is used to indicate the UE to enable user plane integrity protection for the bearer according to a preset integrity protection algorithm. The bearer is used to transmit user plane data that matches first flow matching information corresponding to the bearer.

The receiving module is configured to obtain user plane information of the UE. The user plane information is integrity protected by the UE according to the preset integrity protection algorithm.

In a possible implementation, the apparatus further includes a processing module.

The processing module is configured to after the receiving module obtains the user plane information of the UE, perform integrity protection verification on the user plane information.

In another possible implementation, the receiving module is further configured to before the sending module sends the first indication information and the identifier of the bearer to the UE, obtain a first parameter corresponding to the bearer.

The sending module is further configured to, if the first parameter satisfies a preset rule, send the first indication information and the identifier of the bearer to the UE.

In another possible implementation, the first parameter is used to identify the bearer.

The sending module is further configured to, when the first parameter indicates a preset bearer, send the first indication information and the identifier of the bearer to the UE.

In another possible implementation, the receiving module is further configured to after the sending module sends the first indication information and the identifier of the bearer to the UE, obtain user plane integrity protection information of the UE. The user plane integrity protection information is used to indicate whether the UE supports user plane integrity protection.

The processing module is further configured to, when the user plane integrity protection information indicates that the UE supports user plane integrity protection, enable, according to the preset integrity protection algorithm, user plane integrity protection corresponding to the bearer.

In another possible implementation, the receiving module is further configured to receive a bearer setup request message from a mobility management network element. The bearer setup request message includes the first parameter and a NAS message. The NAS message includes the first flow matching information.

The sending module is further configured to send an RRC connection reconfiguration message to the UE. The RRC connection reconfiguration message includes the first indication information, the identifier of the bearer, and the NAS message. The NAS message includes the first flow matching information.

In another possible implementation, the receiving module is further configured to receive a handover request message from a second base station. The handover request message includes the first parameter.

The sending module is further configured to send an RRC connection reconfiguration message to the UE through the second base station. The RRC connection reconfiguration message includes the first indication information and the identifier of the bearer.

In another possible implementation, the receiving module is further configured to receive a context response message from a third base station. The obtained context response message includes the first parameter.

The sending module is further configured to send an RRC connection resume message to the UE. The RRC connection resume message includes the first indication information and the identifier of the bearer.

In another possible implementation, the preset integrity protection algorithm is the same as a control plane integrity protection algorithm of the first base station and the UE.

According to an eighth aspect, this application provides a user plane integrity protection apparatus, including a receiving module, a processing module, and a sending module.

The receiving module is configured to receive first indication information and an identifier of a bearer that are sent by a first base station. The first indication information is used to indicate the UE to enable, according to a preset integrity protection algorithm, user plane integrity protection for a bearer corresponding to the identifier of the bearer. The bearer is used to transmit user plane data that matches first flow matching information corresponding to the bearer.

The processing module is configured to enable, based on the first indication information and according to the preset integrity protection algorithm, user plane integrity protection corresponding to the bearer.

The processing module is further configured to when to-be-sent user plane information matches the first flow matching information, perform integrity protection on the user plane information according to the preset algorithm.

The sending module is configured to send the user plane information on which user plane integrity protection has been performed to the first base station.

In a possible implementation, the processing module is further configured to when the UE supports user plane integrity protection, enable, based on the first indication information and according to the preset algorithm, user plane integrity protection corresponding to the bearer.

In another possible implementation, the sending module is further configured to after the receiving module receives the first indication information and the identifier of the bearer that are sent by the first base station, send user plane integrity protection information of the UE to the first base station. The user plane integrity protection information is used to indicate whether the UE supports user plane integrity protection.

In another possible implementation, the processing module is further configured to before the receiving module receives the first indication information and the identifier of the bearer that are sent by the first base station, when the user plane information to be sent by the UE satisfies a preset policy, request a core network control network element to set up the bearer.

In another possible implementation, the preset policy is generated by the UE when the UE obtains an IP address of a domain name server.

In another possible implementation, the preset policy is used to indicate that the user plane information to be sent by the UE is a DNS message.

In another possible implementation, the receiving module is further configured to receive the first indication information, the identifier of the bearer, and a NAS message that are sent by the first base station. The NAS message includes the first flow matching information.

In another possible implementation, the first flow matching information is a flow filter template in which a target IP address is a preset IP address.

In another possible implementation, the preset algorithm is the same as a control plane integrity protection algorithm of the first base station and the UE.

According to a ninth aspect, this application provides a base station, including a memory and a processor. The processor executes a computer program in the memory to perform the method according to any one of the first aspect or the implementations of the first aspect.

According to a tenth aspect, this application provides a terminal device, including a memory and a processor. The processor executes a computer program in the memory to perform the method according to any one of the second aspect or the implementations of the second aspect.

According to an eleventh aspect, this application provides a base station, including a memory and a processor. The processor executes a computer program in the memory to perform the method according to any one of the third aspect or the implementations of the third aspect.

According to a twelfth aspect, this application provides a terminal device, including a memory and a processor. The processor executes a computer program in the memory to perform the method according to any one of the fourth aspect or the implementations of the fourth aspect.

According to a thirteenth aspect, an embodiment of the present disclosure provides a storage medium. The storage medium is configured to store a computer program, and the computer program is used to implement the method according to any one of the first aspect or the implementations of the first aspect.

According to a fourteenth aspect, an embodiment of the present disclosure provides a storage medium. The storage medium is configured to store a computer program, and the computer program is used to implement the method according to any one of the second aspect or the implementations of the second aspect.

According to a fifteenth aspect, an embodiment of the present disclosure provides a storage medium. The storage medium is configured to store a computer program, and the computer program is used to implement the method according to any one of the third aspect or the implementations of the third aspect.

According to a sixteenth aspect, an embodiment of the present disclosure provides a storage medium. The storage medium is configured to store a computer program, and the computer program is used to implement the method according to any one of the fourth aspect or the implementations of the fourth aspect.

According to the user plane integrity protection method and apparatus, and the device provided in this application, the first base station may obtain the user plane integrity protection information of the UE, and determine, based on the user plane integrity protection information, whether the UE supports user plane integrity protection. When the first base station supports user plane integrity protection and determines that the UE supports user plane integrity protection, the first base station enables user plane integrity protection according to the user plane integrity protection algorithm, and the UE also enables user plane integrity protection according to the user plane integrity protection algorithm. That is, the first base station may negotiate with the UE, and when both the first base station and the UE support user plane integrity protection, the first base station and the UE enable user plane integrity protection according to the same user plane integrity protection algorithm, to implement a user plane integrity protection procedure on a radio air interface between the first base station and the UE.

DESCRIPTION OF EMBODIMENTS

Figure 1:
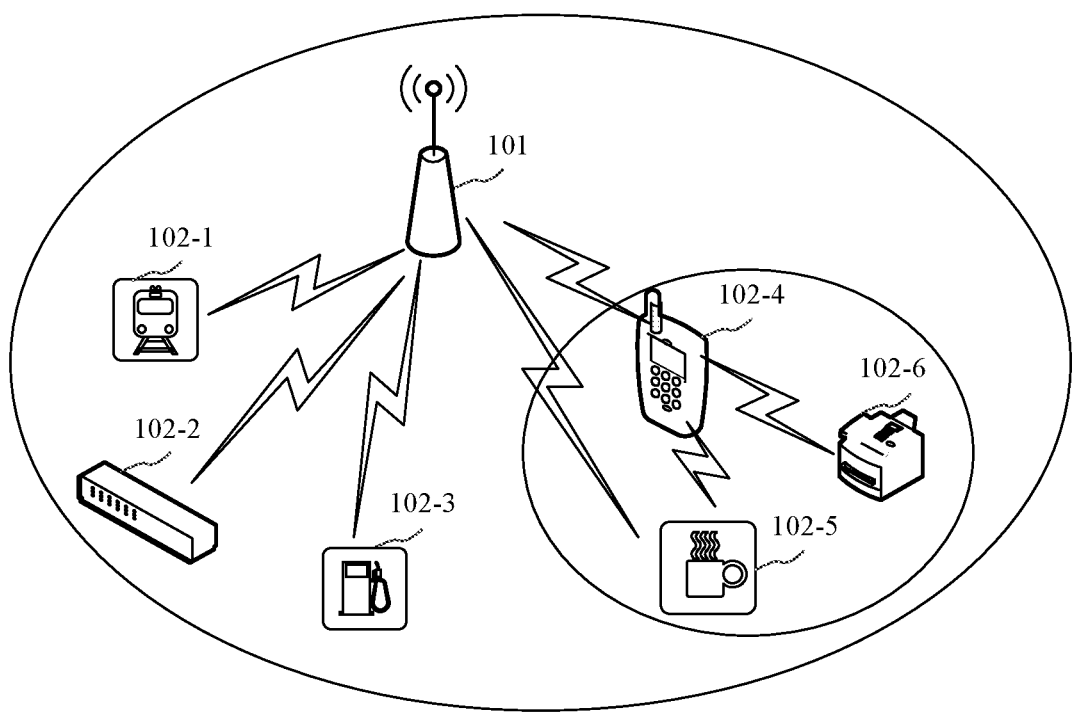
FIG. 1 is an architectural diagram of a communications system according to this application.

FIG. 1 is an architectural diagram of a communications system according to this application. Referring to FIG. 1, the communications system includes a network device 101 and a plurality of UEs. The plurality of UEs is denoted as UE 102-1, UE 102-2, . . . , and UE 102-6.

Optionally, the network device 101 may include a 4G radio base station (eNodeB (eNB)), a transmission and reception point, a micro base station, or the like. Certainly, the network device may further include a 5th generation mobile communication technology (5G) radio base station (gNB). This is not limited in this application.

Optionally, the UE may be a mobile phone (or cellular phone), a computer, or the like. For example, the UE may be a portable, pocket-sized, handheld, computer built-in, or in-vehicle mobile apparatus. In addition, the UE may also be referred to as a mobile station (MS) or a terminal. This is not limited in this application.

It should be noted that FIG. 1 is merely an example of an architectural diagram of a communications system to which this application is applicable, and is not a limitation on the architectural diagram of the communications system to which this application is applicable.

In this application, the base station may negotiate with the UE, and when both the base station and the UE support user plane integrity protection, the base station and the UE enable user plane integrity protection according to a same user plane integrity protection algorithm, to implement a user plane integrity protection procedure on a radio air interface between the base station and the UE.

The following describes in detail the technical solutions shown in this application using specific embodiments. It should be noted that the following several specific embodiments may be combined with each other, and same or similar content is not described repeatedly in different embodiments.

The following describes, using embodiments shown in FIG. 2 to FIG. 10, a negotiation process between UE and a first base station for performing a user plane integrity protection procedure at a granularity of the UE (that is, the user plane integrity protection procedure on a radio air interface between the UE and the first base station is for all user plane information of the UE).

Figure 2:
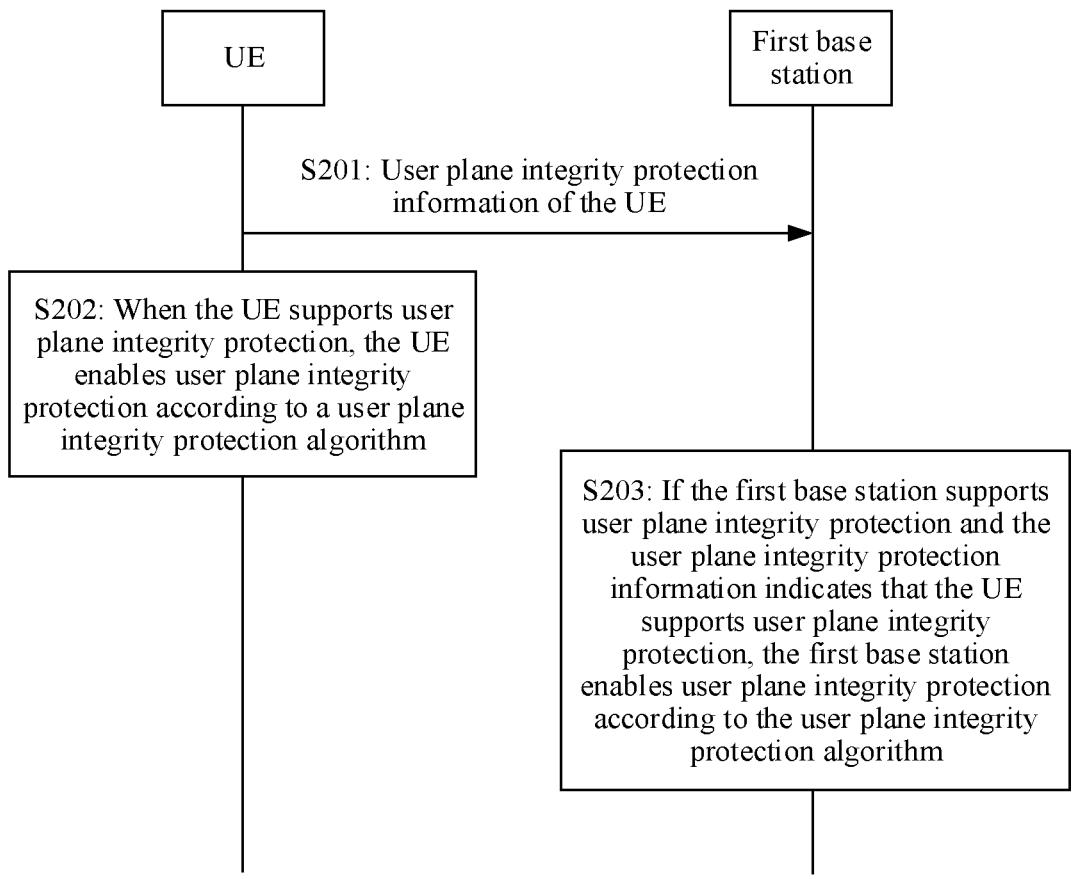
FIG. 2 is a schematic flowchart of a user plane integrity protection method according to this application.

FIG. 2 is a schematic flowchart 1 of a user plane integrity protection method according to this application. Referring to FIG. 2, the method may include the following steps.

S201: UE sends user plane integrity protection information to a first base station.

The user plane integrity protection information is used to indicate whether the UE supports user plane integrity protection.

Optionally, the UE may directly send the user plane integrity protection information to the first base station, or may send the user plane integrity protection information to the first base station through another device.

It should be noted that, when the UE sends the user plane integrity protection information to the first base station through another device, the other device may transparently transmit the user plane integrity protection information sent by the UE, or the other device re-encapsulates the user plane integrity information sent by the UE and sends the re-encapsulated user plane integrity information.

Optionally, the UE may send the user plane integrity protection information to the first base station after receiving a request message sent by the first base station. Alternatively, the UE may actively send the user plane integrity protection information to the first base station. For example, when the UE sends an RRC connection reconfiguration complete message to the first base station, the UE includes the user plane integrity protection information in the RRC connection reconfiguration complete message.

Optionally, the UE may send the user plane integrity protection information to the first base station through a message in an existing procedure (an existing message).

For example, the existing message may include a NAS message, or an RRC message. The NAS message may include an attach request message, a service request message, or a tracking area update message.

Optionally, the UE may send the user plane integrity protection information through the existing message in at least two feasible implementations.

In a feasible implementation, the user plane integrity protection information is sent through a UE network capability information element in the NAS message.

Optionally, the NAS message sent by the UE usually carries the UE network capability information element. A reserved bit is usually set in the UE network capability information element, and the reserved bit in the UE network capability information element may be used to indicate the user plane integrity protection information of the UE.

For example, a flag may be defined in the reserved bit in the UE network capability information element, and the flag is used to indicate the user plane integrity protection information of the UE.

For example, when the flag is 1, it indicates that the UE supports user plane integrity protection, when the flag is 0, it indicates that the UE does not support user plane integrity protection. Alternatively, when the flag is 0, it indicates that the UE supports user plane integrity protection, when the flag is 1, it indicates that the UE does not support user plane integrity protection.

For example, it is assumed that the NAS message is an attach request message, and a structure of a UE network capability information element in the attach request message is shown in Table 1.

the eighth bit in byte 9 is 0, it indicates that the UE does not support user plane integrity protection.

In another feasible implementation, indication information is newly added to the existing message, and the indication information is used to indicate the user plane integrity protection information of the UE.

Optionally, one bit may be added to the existing message, and the newly added bit is used to indicate the indication information. When the newly added bit is 1, it indicates that the UE supports user plane integrity protection, when the newly added bit is 0, it indicates that the UE does not support user plane integrity protection. Alternatively, when the newly added bit is 0, it indicates that the UE supports user plane integrity protection, when the newly added bit is 1, it indicates that the UE does not support user plane integrity protection.

It should be noted that, in the following embodiments, when any device (a device such as UE or a mobility management entity) sends the user plane integrity protection information, either of the foregoing two feasible implementations may be used. In the following embodiments, a process in which the device sends the user plane integrity protection information is not repeatedly described.

It should be noted that the foregoing describes merely an example of a manner of sending the user plane integrity protection information, and does not limit a manner of sending the user plane integrity protection information. In an actual application process, a manner of sending the user plane integrity protection information may be set based on an actual requirement. This is not limited in this application.

S202: When the UE supports user plane integrity protection, the UE enables user plane integrity protection according to a user plane integrity protection algorithm.

The user plane integrity protection algorithm shown in this application is an algorithm used to perform integrity protection on user plane information on an RRC interface

TABLE 1

| Byte 1 | UE network capability IEI | | | | | | |
|---|---|---|---|---|---|---|---|
| Byte 2 | UE network capability content length | | | | | | |
| Byte 3 | EEA0 | 128-EEA1 | 128-EEA2 | 128-EEA3 | EEA4 | EEA5 | EEA6 | EEA7 |
| Byte 4 | EIA0 | 128-EIA1 | 128-EIA2 | 128-EIA3 | EIA4 | EIA5 | EIA6 | EIA7 |
| Byte 5 | UEA0 | UEA1 | UEA2 | UEA3 | UEA4 | UEA5 | UEA6 | UEA7 |
| Byte 6 | UCS2 | UIA1 | UIA2 | UIA3 | UIA4 | UIA5 | UIA6 | UIA7 |
| Byte 7 | ProSe-dd | ProSe | H.245-ASH | ACC-CSFB | LPP | LCS | 1xSRVCC | NF |
| Byte 8 | ePCO | HC-CP CIoT | ERw/oPDN | S1-U data | UP CIoT | UP CIoT | Prose-relay | ProSe-dc |
| Byte 9 | 0 Spare | SGC | N1mode | DCNR | CP backoff | RestrictEC | V2XPC5 | multipleDRB |
| Bytes 10 to 15 | 0 Spare | 0 | 0 | 0 | 0 | 0 | 0 | 0 |

Referring to Table 1, an eighth bit in byte 9 and bits in bytes 10 to 15 are reserved bits (Spare). A reserved bit may be selected from some of the reserved bits, and a flag may be defined in the selected reserved bit to indicate the user plane integrity protection information of the UE. For example, the eighth bit in byte 9 shown in Table 1 may be used to indicate the user plane integrity protection information of the UE. When the eighth bit in byte 9 is 1, it indicates that the UE supports user plane integrity protection, when between the first base station and the UE, or is referred to as a user plane integrity protection algorithm between the first base station and the UE.

Optionally, the user plane integrity protection algorithm may be a newly defined integrity protection algorithm. For example, an algorithm about user plane integrity protection is newly added to a UE network capability information element. Alternatively, an independent user plane integrity protection algorithm information element is defined. The information element includes the newly defined user plane integrity protection algorithm.

Optionally, the user plane integrity protection algorithm may be a preset integrity protection algorithm agreed upon by the UE and the first base station. For example, the preset integrity protection algorithm may be a control plane integrity protection algorithm between the first base station and the UE (or may be referred to as a control plane integrity protection algorithm between the first base station and the UE).

The user plane integrity protection algorithm may be selected by the first base station and sent to the UE. Alternatively, the user plane integrity protection algorithm may be a preset integrity protection algorithm between the UE and the first base station.

Optionally, the UE may enable user plane integrity protection in the following two feasible implementations.

In a feasible implementation, when the UE supports user plane integrity protection and the UE receives first information sent by the first base station, the UE enables user plane integrity protection.

Optionally, the first information may include the user plane integrity protection algorithm, or the first information is used to indicate the UE to enable user plane integrity protection.

If the UE receives the first information sent by the first base station, it indicates that the first base station supports user plane integrity protection. In this case, the UE enables user plane integrity protection when the UE also supports user plane integrity protection.

In the other feasible implementation, when the UE supports user plane integrity protection, the UE enables user plane integrity protection.

In this feasible implementation, the UE enables user plane integrity protection provided that the UE supports user plane integrity protection. If the UE learns, in subsequent communication with the first base station, that the first base station does not support user plane integrity protection, the UE may disable user plane integrity protection.

After the UE enables user plane integrity protection, the UE may perform, according to the user plane integrity protection algorithm, integrity protection on user plane information (or user plane data) that is to be sent to the first base station. Correspondingly, after the UE receives user plane information sent by the first base station, the UE may further perform integrity verification on the received user plane information (or user plane data) according to the user plane integrity protection algorithm.

It should be noted that S201 and S202 are not sequential. S201 and S202 may be performed in sequence or in parallel. When S201 and S202 are performed in sequence, S202 may alternatively be performed before S201. A sequence of performing S201 and S202 is not further limited in this application.

S203: If the first base station supports user plane integrity protection and the user plane integrity protection information indicates that the UE supports user plane integrity protection, the first base station enables user plane integrity protection according to the user plane integrity protection algorithm.

After the first base station enables user plane integrity protection, the first base station may perform, according to the user plane integrity protection algorithm, integrity protection on user plane information that is to be sent to the UE. Correspondingly, after the first base station receives the user plane information sent by the UE, the first base station may further perform integrity verification on the received user plane information according to the user plane integrity protection algorithm.

According to the user plane integrity protection method provided in this application, the first base station may obtain the user plane integrity protection information of the UE, and determine, based on the user plane integrity protection information, whether the UE supports user plane integrity protection. When the first base station supports user plane integrity protection and determines that the UE supports user plane integrity protection, the first base station enables user plane integrity protection according to the user plane integrity protection algorithm, and the UE also enables user plane integrity protection according to the user plane integrity protection algorithm. That is, the first base station may negotiate with the UE, and when both the first base station and the UE support user plane integrity protection, the first base station and the UE enable user plane integrity protection according to the same user plane integrity protection algorithm, to implement a user plane integrity protection procedure on a radio air interface between the first base station and the UE.

In an actual application process, in a plurality of application scenarios (for example, a scenario in which the UE is connected to a single base station, a scenario in which handover is performed between base stations, a scenario in which UE is connected to two base stations, a scenario of an improved core network, and a scenario of an unimproved core network) and in a processing procedure (an access stratum (AS) security mode command (SMC) procedure, an RRC connection setup procedure, or the like), the first base station may negotiate with the UE for user plane integrity protection, to implement the user plane integrity protection procedure between the first base station and the UE. When application scenarios or processing procedures are different, negotiation processes between the first base station and the UE are also different. The following describes in detail negotiation processes between the first base station and the UE for user plane integrity protection in different application scenarios and processing procedures. For details, refer to embodiments shown in FIG. 3 to FIG. 10.

Figure 3:
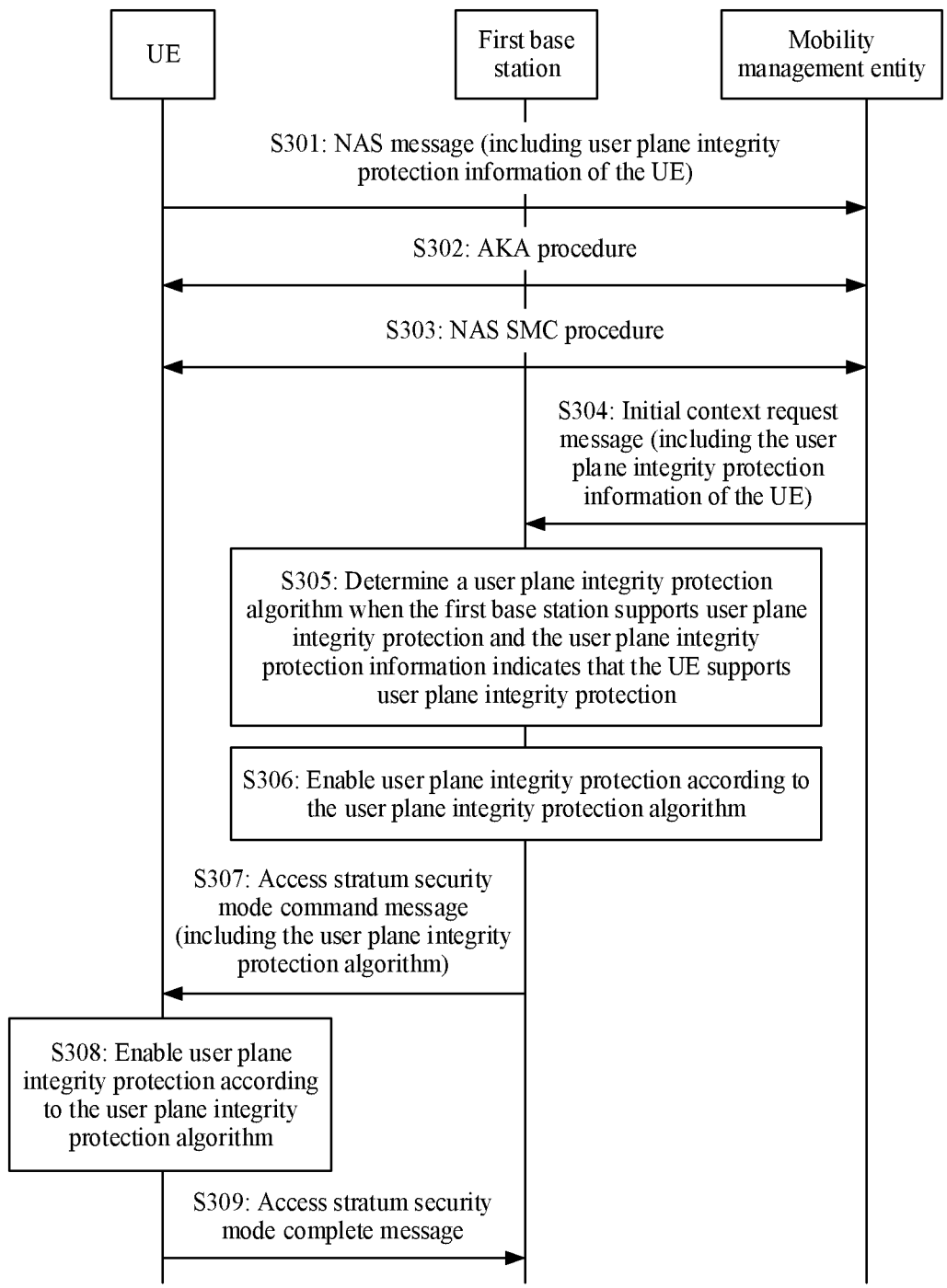
FIG. 3 is a schematic flowchart of a user plane integrity protection method according to this application.
Figure 4:
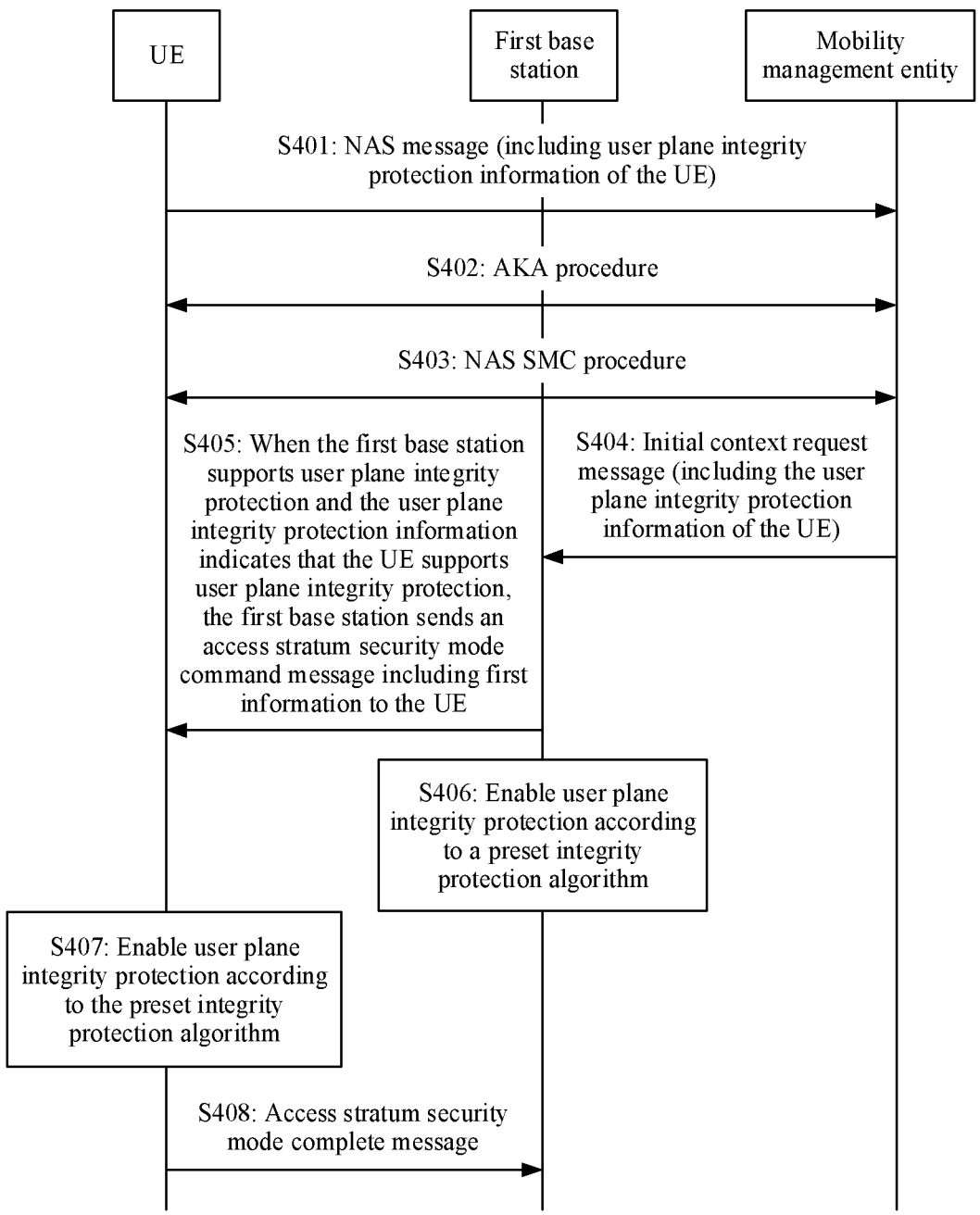
FIG. 4 is a schematic flowchart of a user plane integrity protection method according to this application.

The following describes in detail, using the embodiments shown in FIG. 3 and FIG. 4, a negotiation process between UE and a first base station for performing user plane integrity protection in a scenario of an improved core network when the UE is connected to a single base station (the first base station). For details, refer to the embodiments shown in FIG. 3 and FIG. 4.

FIG. 3 is a schematic flowchart 2 of a user plane integrity protection method according to this application. Referring to FIG. 3, the method may include the following steps.

S301: UE sends a NAS message to a mobility management entity. The NAS message includes user plane integrity protection information of the UE.

Optionally, the NAS message may include an attach request message, a service request message, a tracking area update message, or the like.

Optionally, in an attach procedure, the NAS message sent by the UE to the mobility management entity is an attach request message. In a service request procedure, the NAS message sent by the UE to the mobility management entity is a service request message. In a TAU procedure, the NAS message sent by the UE to the mobility management entity is a tracking area update request message.

It should be noted that the mobility management entity shown in the embodiments of this application may be a mobility management entity (MME), or may be an access and mobility management function (AMF).

S302: The UE and the mobility management entity perform an authentication and key agreement (AKA) procedure.

It should be noted that, for the AKA procedure performed by the UE and the mobility management entity, refer to an AKA procedure in the other approaches. Details are not described herein.

S303: The UE and the mobility management entity perform a NAS SMC procedure.

It should be noted that, for the NAS SMC procedure performed by the UE and the mobility management entity, refer to a NAS SMC procedure in the other approaches. Details are not described herein.

S304: The mobility management entity sends an initial context request message to a first base station. The initial context request message includes the user plane integrity protection information of the UE.

S305: When the first base station supports user plane integrity protection and the user plane integrity protection information indicates that the UE supports user plane integrity protection, the first base station determines a user plane integrity protection algorithm.

It should be noted that, after S304, the first base station and the UE start to perform an AS SMC procedure (S305 to S309). In the AS SMC procedure, the first base station needs to determine a control plane integrity protection algorithm between the first base station and the UE.

In the AS SMC procedure, the first base station determines the user plane integrity protection algorithm between the first base station and the UE only when the first base station supports user plane integrity protection and the user plane integrity protection information indicates that the UE supports user plane integrity protection.

Optionally, the first base station may determine the control plane integrity protection algorithm between the first base station and the UE as the user plane integrity protection algorithm.

Optionally, if the integrity protection information of the UE includes a newly defined user plane integrity protection algorithm, the first base station may select an algorithm from the newly defined user plane integrity protection algorithm as the user plane integrity protection algorithm.

S306: The first base station enables user plane integrity protection according to the user plane integrity protection algorithm.

S307: The first base station sends an access stratum security mode command message to the UE. The access stratum security mode command message includes the determined user plane integrity protection algorithm.

It should be noted that, S306 and S307 are not sequential. S306 and S307 may be performed in sequence or in parallel. When S306 and S307 are performed in sequence, S307 may alternatively be performed before S306.

S308: The UE enables user plane integrity protection according to the user plane integrity protection algorithm in the access stratum security mode command message.

S309: The UE sends an access stratum security mode complete message to the first base station.

It should be noted that S308 and S309 are not sequential. S308 and S309 may be performed in sequence or in parallel. When S308 and S309 are performed in sequence, S309 may alternatively be performed before S308.

It should be further noted that when the first base station does not support user plane integrity protection, or the user plane integrity protection information indicates that the UE does not support user plane integrity protection, the first base station performs neither S305 nor S306, and the UE does not perform S308. In addition, in S307, the access stratum security mode command message does not include the determined user plane integrity protection algorithm.

In the embodiment shown in FIG. 3, the first base station may obtain the user plane integrity protection information of the UE through the mobility management entity, to determine whether the UE supports user plane integrity protection. The first base station negotiates with the UE such that when both the first base station and the UE support user plane integrity protection, the first base station and the UE enable user plane integrity protection according to the same user plane integrity protection algorithm, to implement a user plane integrity protection procedure on a radio air interface between the first base station and the UE.

FIG. 4 is a schematic flowchart 3 of a user plane integrity protection method according to this application. Referring to FIG. 4, the method may include the following steps.

S401: UE sends a NAS message to a mobility management entity. The NAS message includes user plane integrity protection information of the UE.

S402: The UE and the mobility management entity perform an authentication and key agreement (AKA) procedure.

S403: The UE and the mobility management entity perform a NAS SMC procedure.

S404: The mobility management entity sends an initial context request message to a first base station. The initial context request message includes the user plane integrity protection information of the UE.

It should be noted that for processes of performing S401 to S404, refer to S301 to S304. Details are not described herein again.

S405: When the first base station supports user plane integrity protection and the user plane integrity protection information indicates that the UE supports user plane integrity protection, the first base station sends an access stratum security mode command message including first information to the UE.

The first information is used to indicate the UE to enable user plane integrity protection according to a preset integrity protection algorithm.

Optionally, the preset integrity protection algorithm may be a control plane integrity protection algorithm, determined by the first base station in an AS SMC procedure, between the first base station and the UE.

Certainly, the preset integrity protection algorithm may be another algorithm. This is not limited in this application.

S406: The first base station enables user plane integrity protection according to the preset integrity protection algorithm.

It should be noted that S405 and S406 are not sequential. S405 and S406 may be performed in sequence or in parallel. When S405 and S406 are performed in sequence, S406 may alternatively be performed before S405.

S407: The UE enables user plane integrity protection according to the preset integrity protection algorithm.

S408: The UE sends an access stratum security mode complete message to the first base station.

It should be noted that S407 and S408 are not sequential. S407 and S408 may be performed in sequence or in parallel. When S407 and S408 are performed in sequence, S408 may alternatively be performed before S407.

It should be further noted that when the first base station does not support user plane integrity protection, or the user plane integrity protection information indicates that the UE does not support user plane integrity protection, in S405, the access stratum security mode command message sent by the first base station to the UE does not include the first information. In addition, the first base station does not perform S406, and the UE does not perform S407.

In the embodiment shown in FIG. 4, the first base station may obtain the user plane integrity protection information of the UE through the mobility management entity, to determine whether the UE supports user plane integrity protection. The first base station negotiates with the UE such that when both the first base station and the UE support user plane integrity protection, the first base station and the UE enable user plane integrity protection according to the same user plane integrity protection algorithm, to implement a user plane integrity protection procedure on a radio air interface between the first base station and the UE.

Figure 5:
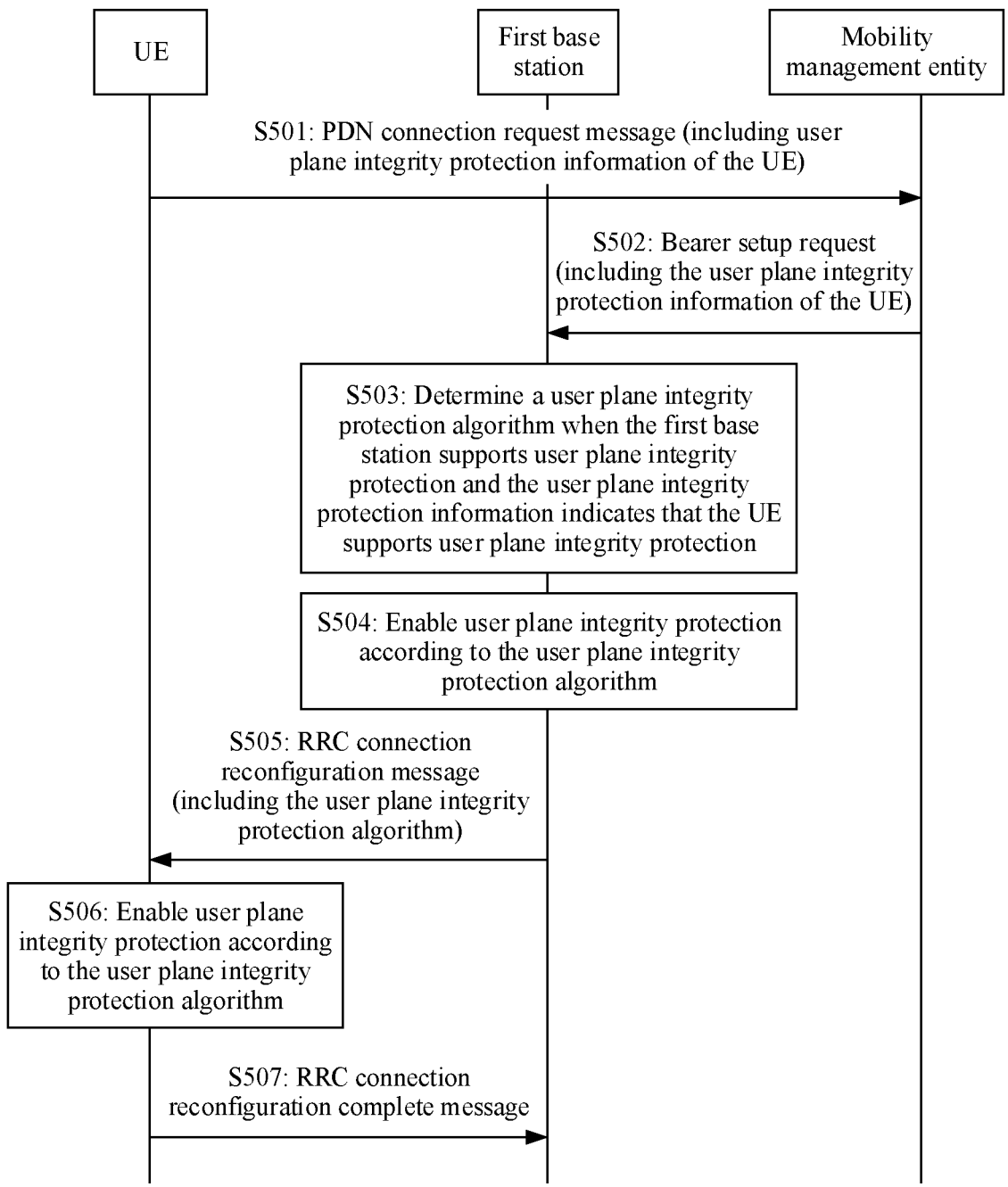
FIG. 5 is a schematic flowchart of a user plane integrity protection method according to this application.

The following describes in detail, using the embodiment shown in FIG. 5, a negotiation process between UE and a first base station for performing user plane integrity protection in a scenario of an improved core network in an RRC connection setup procedure when the UE is connected to a single base station (the first base station).

FIG. 5 is a schematic flowchart 4 of a user plane integrity protection method according to this application. Referring to FIG. 5, the method may include the following steps.

S501: UE sends a PDN connection request message to a mobility management entity. The PDN connection request message includes user plane integrity protection information of the UE.

S502: The mobility management entity sends a bearer setup request message to a first base station. The bearer setup request message includes the user plane integrity protection information of the UE.

S503: When the first base station supports user plane integrity protection and the user plane integrity protection information indicates that the UE supports user plane integrity protection, the first base station determines a user plane integrity protection algorithm.

Before S501, the UE and the first base station have completed an AS SMC procedure. In addition, the first base station has determined a control plane integrity protection algorithm of the first base station and the UE in the AS SMC procedure.

Optionally, the first base station may determine the control plane integrity protection algorithm of the first base station and the UE as the user plane integrity protection algorithm.

Optionally, if the integrity protection information of the UE includes a newly defined user plane integrity protection algorithm, the first base station may select an algorithm from the newly defined user plane integrity protection algorithm as the user plane integrity protection algorithm.

S504: The first base station enables user plane integrity protection according to the user plane integrity protection algorithm.

S505: The first base station sends an RRC connection reconfiguration message to the UE. The RRC connection reconfiguration message includes the user plane integrity protection algorithm determined by the first base station.

It should be noted that S504 and S505 are not sequential. S504 and S505 may be performed in sequence or in parallel. When S504 and S505 are performed in sequence, S505 may alternatively be performed before S504.

S506: The UE enables user plane integrity protection according to the user plane integrity protection algorithm in the RRC connection reconfiguration message.

S507: The UE sends an RRC connection reconfiguration complete message to the first base station.

It should be noted that S506 and S507 are not sequential. S506 and S507 may be performed in sequence or in parallel. When S506 and S507 are performed in sequence, S507 may alternatively be performed before S506.

It should be further noted that when the first base station does not support user plane integrity protection, or the user plane integrity protection information indicates that the UE does not support user plane integrity protection, the first base station performs neither S503 nor S504, and the UE does not perform S506. In addition, in S505, the RRC connection reconfiguration message sent by the first base station to the UE does not include the user plane integrity protection algorithm.

In the embodiment shown in FIG. 5, the first base station may obtain the user plane integrity protection information of the UE through the mobility management entity, to determine whether the UE supports user plane integrity protection. The first base station negotiates with the UE such that when both the first base station and the UE support user plane integrity protection, the first base station and the UE enable user plane integrity protection according to the same user plane integrity protection algorithm, to implement a user plane integrity protection procedure on a radio air interface between the first base station and the UE.

It should be further noted that, in the embodiment shown in FIG. 5, the first base station may further send first information to the UE, where the first information is used to indicate the UE to enable user plane integrity protection according to a preset integrity protection algorithm. For a specific implementation process, refer to the embodiment shown in FIG. 4. Details are not described herein again.

Figure 6:
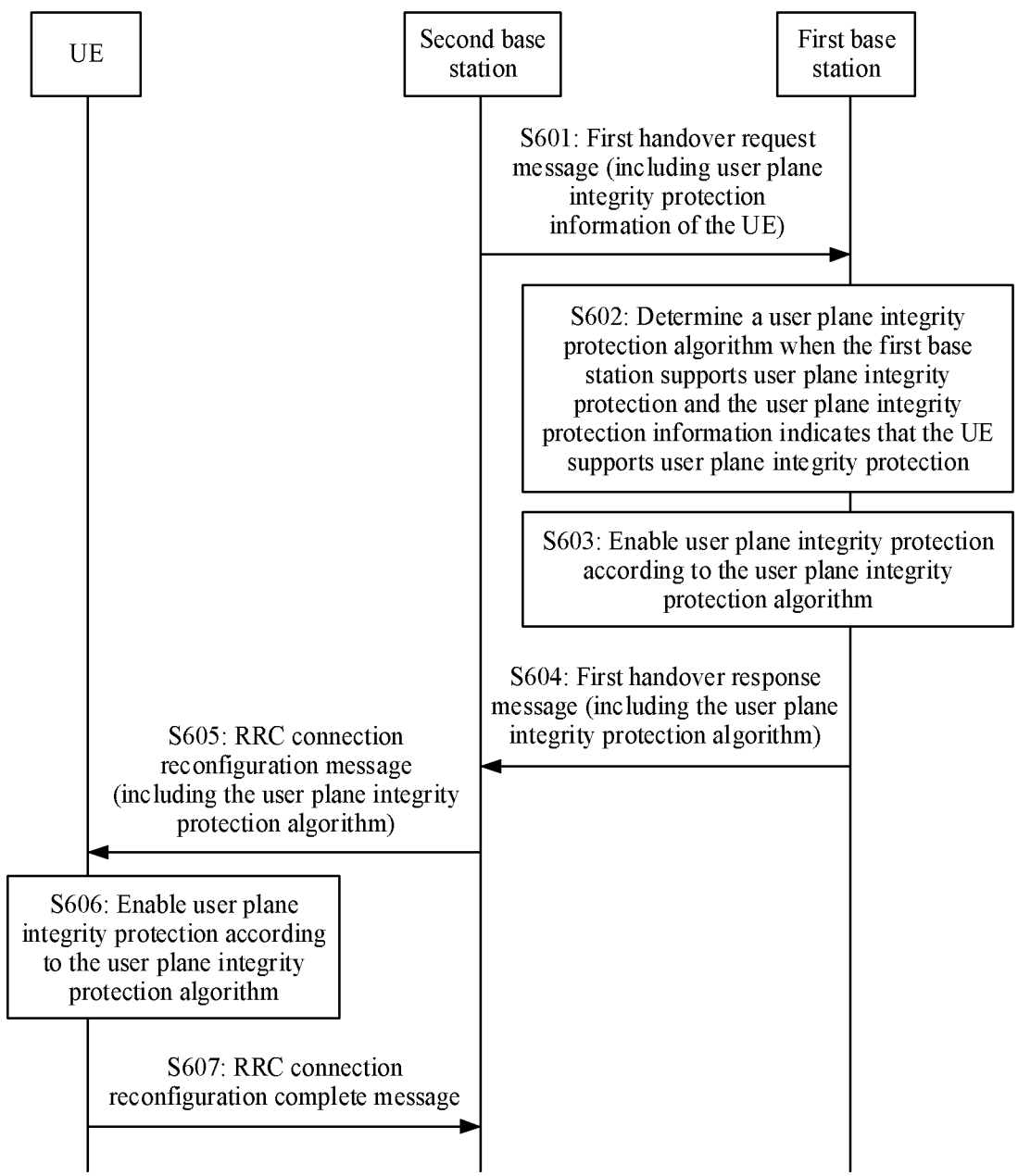
FIG. 6 is a schematic flowchart of a user plane integrity protection method according to this application.

The following describes in detail, using the embodiment shown in FIG. 6, a negotiation process between UE and a first base station for performing user plane integrity protection in a scenario of an improved core network when the UE is handed over between base stations (the UE is handed over from a second base station to the first base station, and there is a communications interface between the first base station and the second base station).

FIG. 6 is a schematic flowchart 5 of a user plane integrity protection method according to this application. Referring to FIG. 6, the method may include the following steps.

S601: A second base station sends a first handover request message to a first base station. The first handover request message includes user plane integrity protection information of the UE.

It should be noted that, before S601, the UE has sent the user plane integrity protection information of the UE to the second base station.

S602: When the first base station supports user plane integrity protection and the user plane integrity protection information indicates that the UE supports user plane integrity protection, the first base station determines a user plane integrity protection algorithm.

Optionally, if the integrity protection information of the UE includes a newly defined user plane integrity protection algorithm, the first base station may select an algorithm from the newly defined user plane integrity protection algorithm as the user plane integrity protection algorithm.

Optionally, the first base station may determine a control plane integrity protection algorithm of the first base station and the UE as the user plane integrity protection algorithm.

Optionally, before the UE is handed over, if both the UE and the second base station enable user plane integrity protection, the user plane integrity protection algorithm, determined by the first base station, between the first base station and the UE may be the same as a user plane integrity protection algorithm between the second base station and the UE.

S603: The first base station enables user plane integrity protection according to the user plane integrity protection algorithm.

S604: The first base station sends a first handover response message to the second base station. The first handover response message includes the user plane integrity protection algorithm.

It should be noted that if the user plane integrity protection algorithm, determined by the first base station, between the first base station and the UE is the same as the user plane integrity protection algorithm between the second base station and the UE, the first base station may further include indication information in the first handover response message sent to the second base station. The indication information is used to indicate the UE to enable user plane integrity protection according to the user plane integrity protection algorithm between the second base station and the UE.

It should be noted that S603 and S604 are not sequential. S603 and S604 may be performed in sequence or in parallel. When S603 and S604 are performed in sequence, S604 may alternatively be performed before S603.

S605: The second base station sends an RRC connection reconfiguration message to the UE. The RRC connection reconfiguration message includes the user plane integrity protection algorithm determined by the first base station.

It should be noted that when the first handover response message includes the indication information, the RRC connection reconfiguration message also includes the indication information.

S606: The UE enables user plane integrity protection according to the user plane integrity protection algorithm.

S607: The UE sends an RRC connection reconfiguration complete message to the first base station.

It should be noted that S606 and S607 are not sequential. S606 and S607 may be performed in sequence or in parallel. When S606 and S607 are performed in sequence, S607 may alternatively be performed before S606.

Optionally, after S607, the first base station may send a path switch request message to a mobility management entity, where the path switch request message carries an Evolved Packet System (EPS) security capability information element (IE). The mobility management entity performs comparative verification on the EPS security capability IE, and after the comparative verification succeeds, sends a path switch response (Path Switch Request Ack) message to the first base station.

It should be further noted that when the first base station does not support user plane integrity protection, or the user plane integrity protection information indicates that the UE does not support user plane integrity protection, the first base station performs neither S602 nor S603, and the UE does not perform S606. In addition, in S604, the first handover response message sent by the first base station to the second base station does not include the user plane integrity protection algorithm. In S605, the RRC connection reconfiguration message sent by the second base station to the UE does not include the user plane integrity protection algorithm, either.

In the embodiment shown in FIG. 6, the first base station may obtain the user plane integrity protection information of the UE through the second base station and the mobility management entity, to determine whether the UE supports user plane integrity protection. The first base station negotiates with the UE such that when both the first base station and the UE support user plane integrity protection, the first base station and the UE enable user plane integrity protection according to the same user plane integrity protection algorithm, to implement a user plane integrity protection procedure on a radio air interface between the first base station and the UE.

It should be further noted that, in the embodiment shown in FIG. 6, the first base station may further send first information to the UE, where the first information is used to indicate the UE to enable user plane integrity protection according to a preset integrity protection algorithm. For a specific implementation process, refer to the embodiment shown in FIG. 4. Details are not described herein again.

Figure 7:
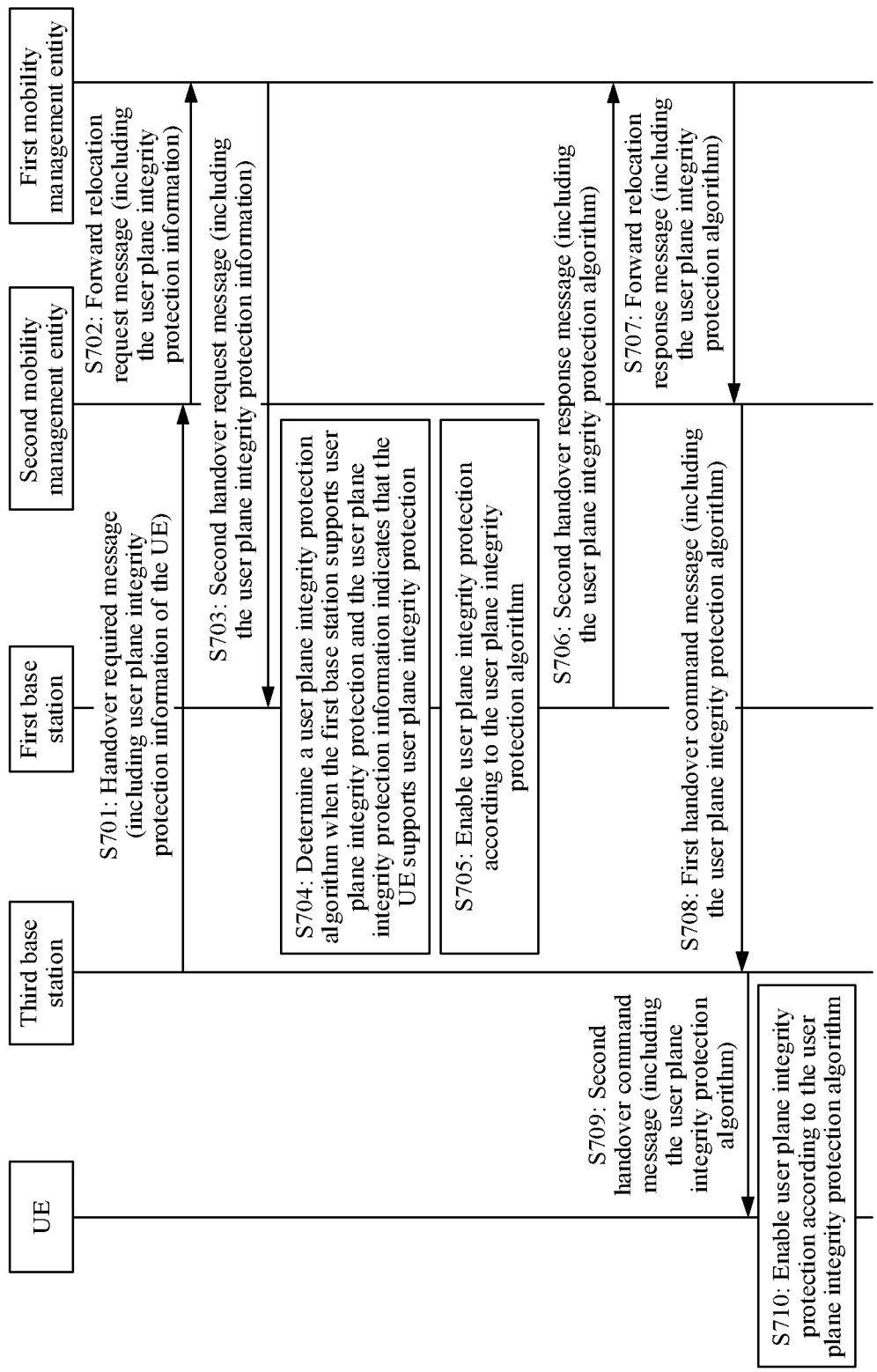
FIG. 7 is a schematic flowchart of a user plane integrity protection method according to this application.

The following describes in detail, using the embodiment shown in FIG. 7, a negotiation process between UE and a first base station for performing user plane integrity protection in a scenario of an improved core network when the UE is handed over between base stations (the UE is handed over from a second base station to the first base station, and there is no communications interface between the first base station and the second base station).

FIG. 7 is a schematic flowchart 6 of a user plane integrity protection method according to this application. Referring to FIG. 7, the method may include the following steps.

S701: A third base station sends a handover required message to a second mobility management entity. The handover required message includes user plane integrity protection information of UE.

It should be noted that, before S701, the UE has sent the user plane integrity protection information of the UE to the third base station.

S702: The second mobility management entity sends a forward relocation request message to a first mobility management entity. The forward relocation request message includes the user plane integrity protection information.

S703: The first mobility management entity sends a second handover request message to a first base station. The second handover request message includes the user plane integrity protection information.

S704: When the first base station supports user plane integrity protection and the user plane integrity protection information indicates that the UE supports user plane integrity protection, the first base station determines a user plane integrity protection algorithm.

Optionally, if the integrity protection information of the UE includes a newly defined user plane integrity protection algorithm, the first base station may select an algorithm from the newly defined user plane integrity protection algorithm as the user plane integrity protection algorithm.

Optionally, the first base station may determine a control plane integrity protection algorithm of the first base station and the UE as the user plane integrity protection algorithm.

Optionally, before the UE is handed over, if both the UE and the third base station enable user plane integrity protection, the user plane integrity protection algorithm, determined by the first base station, between the first base station and the UE may be the same as a user plane integrity protection algorithm between the third base station and the UE.

S705: The first base station enables user plane integrity protection according to the user plane integrity protection algorithm.

S706: The first base station sends a second handover response (Handover Request Ack) message to the first mobility management entity. The second handover response message includes the user plane integrity protection algorithm.

It should be noted that if the user plane integrity protection algorithm, determined by the first base station, between the first base station and the UE may be the same as the user plane integrity protection algorithm between the third base station and the UE, the first base station may further send indication information to the UE, to indicate the UE to enable user plane integrity protection according to the user plane integrity protection algorithm between the third base station and the UE.

It should be noted that S705 and S706 are not sequential. S705 and S706 may be performed in sequence or in parallel. When S705 and S706 are performed in sequence, S706 may alternatively be performed before S705.

S707: The first mobility management entity sends a forward relocation response message to the second mobility management entity. The forward relocation response message includes the user plane integrity protection algorithm.

S708: The second mobility management entity sends a first handover command message to the third base station. The first handover command message includes the user plane integrity protection algorithm.

S709: The third base station sends a second handover command message to the UE. The second handover command message includes the user plane integrity protection algorithm.

S710: The UE enables user plane integrity protection according to the user plane integrity protection algorithm.

It should be further noted that when the first base station does not support user plane integrity protection, or the user plane integrity protection information indicates that the UE does not support user plane integrity protection, the first base station performs neither S704 nor S705, and the UE does not perform S710. In addition, corresponding messages (the handover command message, the forward relocation request message, and the second handover request message) do not carry the user plane integrity protection information, and corresponding messages (the second handover response message, the first handover command message, and the second handover command message) do not carry the user plane integrity protection algorithm.

In the embodiment shown in FIG. 7, the first base station may obtain the user plane integrity protection information of the UE through the third base station, the first mobility management entity, and the second mobility management entity, to determine whether the UE supports user plane integrity protection. The first base station negotiates with the UE such that when both the first base station and the UE support user plane integrity protection, the first base station and the UE enable user plane integrity protection according to the same user plane integrity protection algorithm, to implement a user plane integrity protection procedure on a radio air interface between the first base station and the UE.

It should be further noted that, in the embodiment shown in FIG. 7, the first base station may further send first information to the UE, where the first information is used to indicate the UE to enable user plane integrity protection according to a preset integrity protection algorithm. For a specific implementation process, refer to the embodiment shown in FIG. 4. Details are not described herein again.

Figure 8:
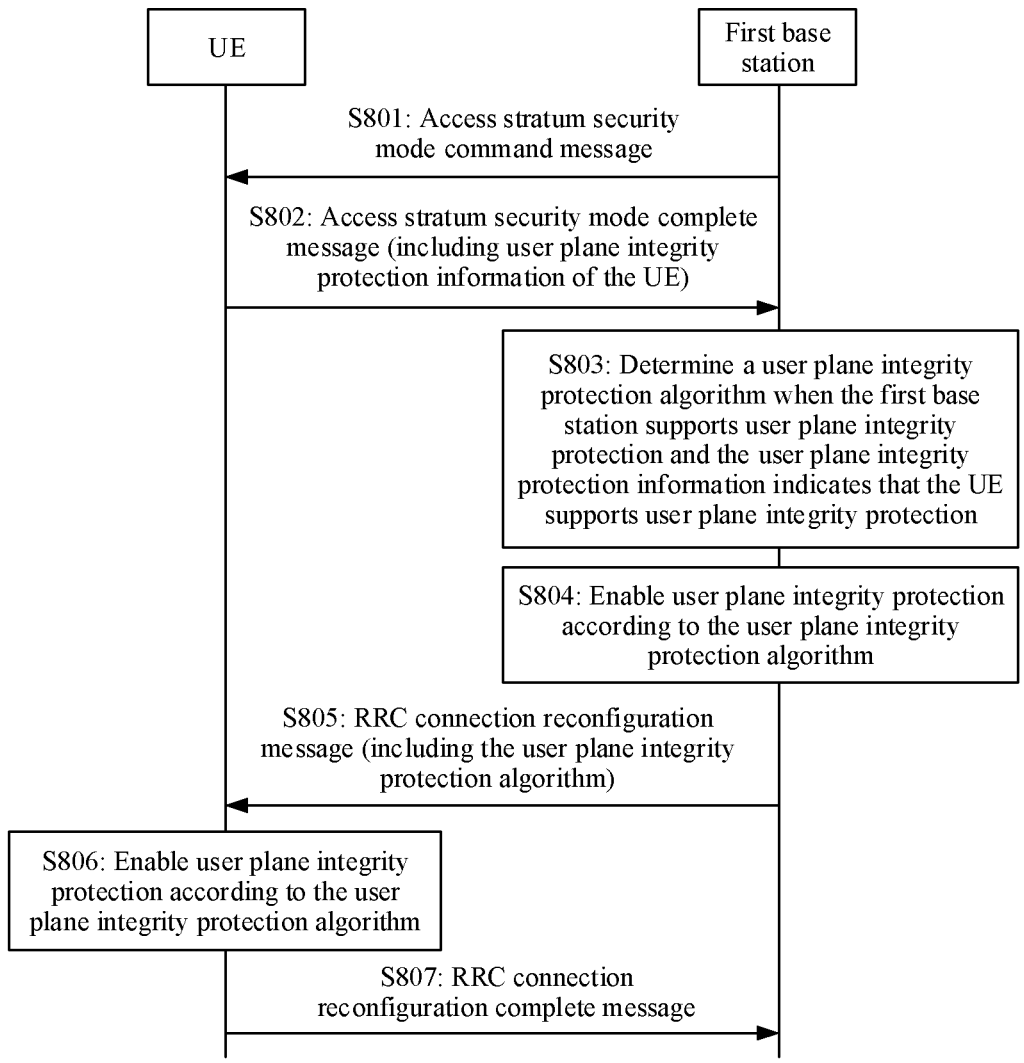
FIG. 8 is a schematic flowchart of a user plane integrity protection method according to this application.

The following describes in detail, using the embodiment shown in FIG. 8, a negotiation process between UE and a first base station for performing user plane integrity protection in a scenario of an unimproved core network when the UE is connected to a single base station (the first base station).

FIG. 8 is a schematic flowchart 7 of a user plane integrity protection method according to this application. Referring to FIG. 8, the method may include the following steps.

S801: A first base station sends an access stratum security mode command message to UE.

S802: The UE sends an access stratum security mode complete message to the first base station. The access stratum security mode complete message includes user plane integrity protection information of the UE.

S803: When the first base station supports user plane integrity protection and the user plane integrity protection information indicates that the UE supports user plane integrity protection, the first base station determines a user plane integrity protection algorithm.

Optionally, if the integrity protection information of the UE includes a newly defined user plane integrity protection algorithm, the first base station may select an algorithm from the newly defined user plane integrity protection algorithm as the user plane integrity protection algorithm.

Optionally, the first base station may determine a control plane integrity protection algorithm between the first base station and the UE as the user plane integrity protection algorithm.

S804: The first base station enables user plane integrity protection according to the user plane integrity protection algorithm.

S805: The first base station sends an RRC connection reconfiguration message to the UE. The RRC connection reconfiguration message includes the user plane integrity protection algorithm.

It should be noted that S804 and S805 are not sequential. S804 and S805 may be performed in sequence or in parallel. When S804 and S805 are performed in sequence, S805 may alternatively be performed before S804.

S806: The UE enables user plane integrity protection according to the user plane integrity protection algorithm.

S807: The UE sends an RRC connection reconfiguration complete message to the first base station.

It should be noted that S806 and S807 are not sequential. S806 and S807 may be performed in sequence or in parallel. When S806 and S807 are performed in sequence, S807 may alternatively be performed before S806.

It should be further noted that when the first base station does not support user plane integrity protection, or the user plane integrity protection information indicates that the UE does not support user plane integrity protection, the first base station performs neither S803 nor S804, and the UE does not perform S806. In addition, the RRC connection reconfiguration message does not include the user plane integrity protection algorithm determined by the first base station.

In the embodiment shown in FIG. 8, the first base station may directly obtain the user plane integrity protection information of the UE from the UE, to determine whether the UE supports user plane integrity protection. The first base station negotiates with the UE such that when both the first base station and the UE support user plane integrity protection, the first base station and the UE enable user plane integrity protection according to the same user plane integrity protection algorithm, to implement a user plane integrity protection procedure on a radio air interface between the first base station and the UE.

It should be further noted that, in the embodiment shown in FIG. 8, the first base station may further send first information to the UE, where the first information is used to indicate the UE to enable user plane integrity protection according to a preset integrity protection algorithm. For a specific implementation process, refer to the embodiment shown in FIG. 4. Details are not described herein again.

Figure 9:
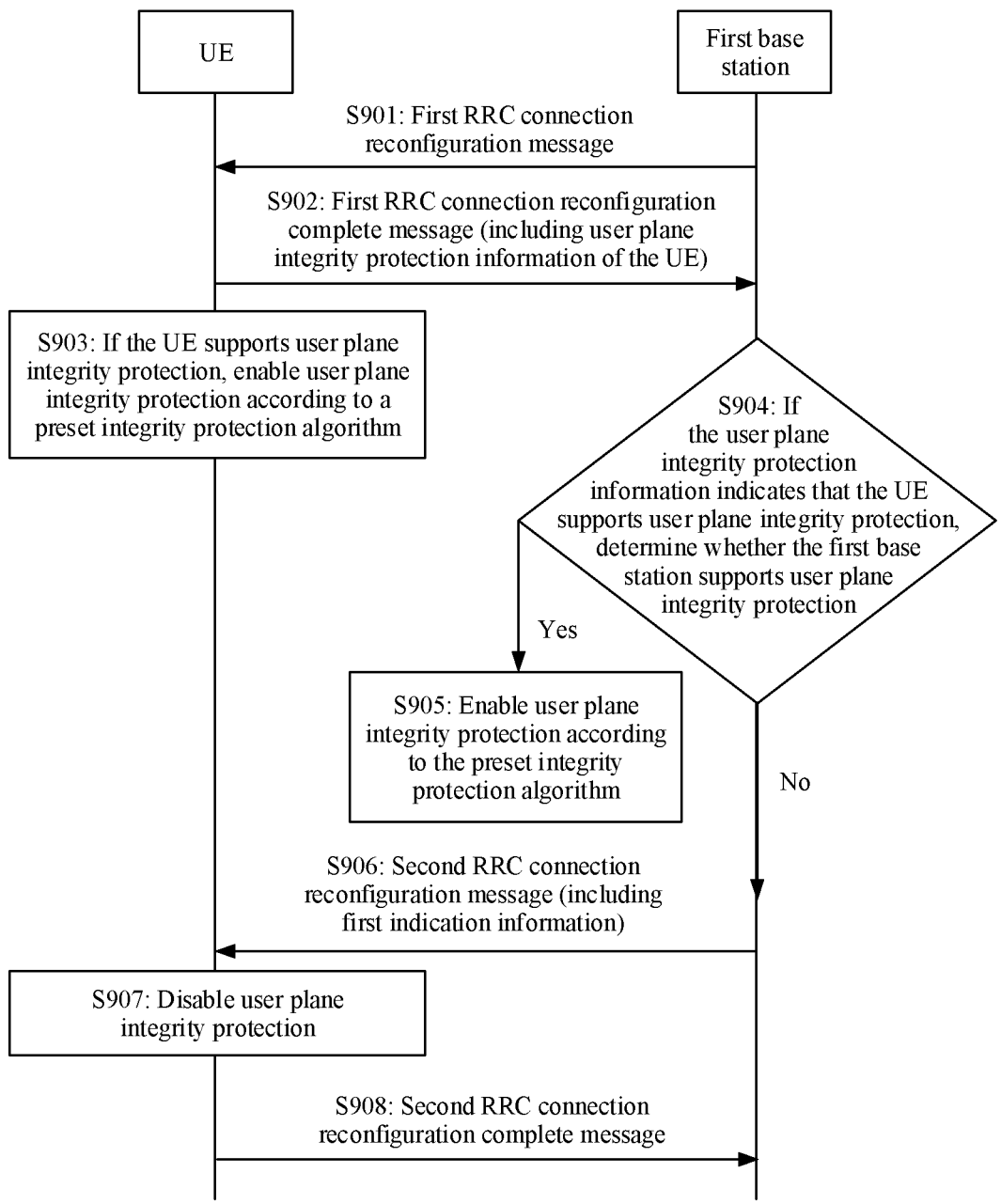
FIG. 9 is a schematic flowchart of a user plane integrity protection method according to this application.

The following describes in detail, using the embodiment shown in FIG. 9, a negotiation process between UE and a first base station for performing user plane integrity protection in a scenario of an unimproved core network in an RRC connection setup procedure when the UE is connected to a single base station (the first base station).

FIG. 9 is a schematic flowchart 8 of a user plane integrity protection method according to this application. Referring to FIG. 9, the method may include the following steps.

S901: A first base station sends a first RRC connection reconfiguration message to UE.

S902: The UE sends a first RRC connection reconfiguration complete message to the first base station. The first RRC connection reconfiguration complete message includes user plane integrity protection information of the UE.

S903: If the UE supports user plane integrity protection, the UE enables user plane integrity protection according to a preset integrity protection algorithm.

Optionally, the preset integrity protection algorithm may be a control plane integrity protection algorithm of the UE and the first base station.

It should be noted that S902 and S903 are not sequential. S902 and S903 may be performed in sequence or in parallel. When S902 and S903 are performed in sequence, S903 may alternatively be performed before S902.

S904: If the user plane integrity protection information indicates that the UE supports user plane integrity protection, the first base station determines whether the first base station supports user plane integrity protection.

If the first base station supports user plane integrity protection, S905 is performed.

If the first base station does not support user plane integrity protection, S906 to S908 are performed.

S905: The first base station enables user plane integrity protection according to the preset integrity protection algorithm.

S906: The first base station sends a second RRC connection reconfiguration message to the UE. The second RRC connection reconfiguration message includes first indication information.

The first indication information is used to indicate the UE not to enable user plane integrity protection.

S907: The UE disables user plane integrity protection.

S908: The UE sends a second RRC connection reconfiguration complete message to the first base station.

It should be noted that S907 and S908 are not sequential. S907 and S908 may be performed in sequence or in parallel. When S907 and S908 are performed in sequence, S908 may alternatively be performed before S907.

In the embodiment shown in FIG. 9, the first base station may directly obtain the user plane integrity protection information of the UE from the UE, to determine whether the UE supports user plane integrity protection. The first base station negotiates with the UE such that when both the first base station and the UE support user plane integrity protection, the first base station and the UE enable user plane integrity protection according to the same user plane integrity protection algorithm, to implement a user plane integrity protection procedure on a radio air interface between the first base station and the UE.

It should be further noted that, in the embodiment shown in FIG. 9, the first base station may further send first information to the UE, where the first information is used to indicate the UE to enable user plane integrity protection according to the preset integrity protection algorithm. For a specific implementation process, refer to the embodiment shown in FIG. 4. Details are not described herein again.

Figure 10:
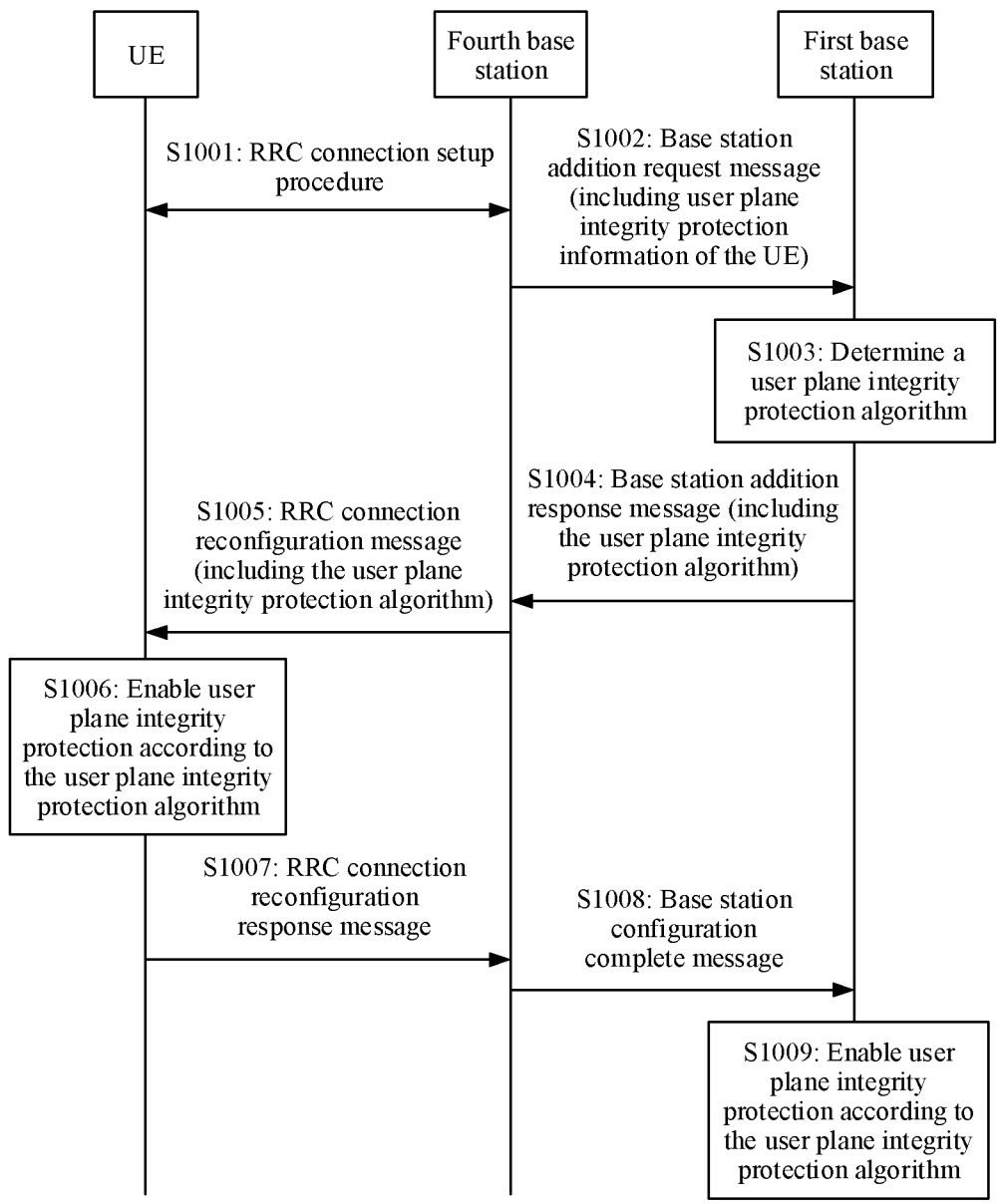
FIG. 10 is a schematic flowchart of a user plane integrity protection method according to this application.

The following describes in detail, using the embodiment shown in FIG. 10, a negotiation process between UE and a first base station for performing user plane integrity protection in a scenario of an unimproved core network in an RRC connection setup procedure when the UE is connected to two base stations (the first base station and a second base station).

FIG. 10 is a schematic flowchart 9 of a user plane integrity protection method according to this application. Referring to FIG. 10, the method may include the following steps.

S1001: UE performs an RRC connection setup (RRC Connection Established) procedure with a fourth base station.

In the RRC connection setup procedure, the fourth base station obtains user plane integrity protection information of the UE.

Optionally, the fourth base station may be a master base station, and a first base station is a secondary base station. For example, the fourth base station may be a 4G base station, and the first base station may be a 5G base station.

S1002: The fourth base station sends a base station addition request (SgNB Addition Request) message to the first base station. The base station addition request message includes the user plane integrity protection information of the UE.

It should be noted that, before S1002, the UE has sent the user plane integrity protection information of the UE to the second base station.

S1003: The first base station determines a user plane integrity protection algorithm.

Optionally, if the integrity protection information of the UE includes a newly defined user plane integrity protection algorithm, the first base station may select an algorithm from the newly defined user plane integrity protection algorithm as the user plane integrity protection algorithm.

Optionally, before S1003, the first base station and the UE have completed an AS SMC procedure. In addition, a control plane integrity protection algorithm of the first base station and the UE is determined in the AS SMC procedure.

Optionally, the first base station may determine the control plane integrity protection algorithm of the first base station and the UE as the user plane integrity protection algorithm.

S1004: The first base station sends a base station addition response (SgNB Addition Request Acknowledge) message to the fourth base station. The base station addition response message includes the user plane integrity protection algorithm.

S1005: The fourth base station sends an RRC connection reconfiguration message to the UE. The RRC connection reconfiguration message includes the user plane integrity protection algorithm.

S1006: The UE enables user plane integrity protection according to the user plane integrity protection algorithm.

S1007: The UE sends an RRC connection reconfiguration response message to the fourth base station.

It should be noted that S1006 and S1007 are not sequential. S1006 and S1007 may be performed in sequence or in parallel. When S1006 and S1007 are performed in sequence, S1007 may alternatively be performed before S1006.

S1008: The fourth base station sends a base station configuration complete (SgNB Reconfiguration Complete) message to the first base station.

S1009: The first base station enables user plane integrity protection according to the user plane integrity protection algorithm.

It should be noted that S1009 may alternatively be performed after any one of S1004 to S1008, or may be performed in parallel with any one of S1004 to S1008.

It should be noted that, after S1009, a random-access procedure is performed between the UE and the first base station.

It should be further noted that when the first base station does not support user plane integrity protection, or the user plane integrity protection information indicates that the UE does not support user plane integrity protection, the first base station performs neither S1003 nor S1009, and the UE does not perform S1006. In addition, the base station addition response message and the RRC connection reconfiguration message do not include the user plane integrity protection algorithm.

In the embodiment shown in FIG. 10, the first base station may obtain the user plane integrity protection information of the UE through the fourth base station from the UE, to determine whether the UE supports user plane integrity protection. The first base station negotiates with the UE such that when both the first base station and the UE support user plane integrity protection, the first base station and the UE enable user plane integrity protection according to the same user plane integrity protection algorithm, to implement a user plane integrity protection procedure on a radio air interface between the first base station and the UE.

It should be further noted that, in the embodiment shown in FIG. 10, the first base station may further send first information to the UE, where the first information is used to indicate the UE to enable user plane integrity protection according to a preset integrity protection algorithm. For a specific implementation process, refer to the embodiment shown in FIG. 4. Details are not described herein again.

In the embodiments shown in FIG. 8 to FIG. 10, during negotiation with the UE for user plane integrity protection, a user plane integrity protection procedure on a radio air interface between the first base station and the UE can be implemented without a mobility management entity, that is, a core network device (for example, an MME) does not need to be improved.

The following describes, using embodiments shown in FIG. 11 to FIG. 16, a negotiation process between UE and a first base station for performing a user plane integrity protection procedure at a granularity of a bearer (that is, the user plane integrity protection procedure on a radio air interface between the UE and the first base station is for user plane information corresponding to some bearers of the UE).

Figure 11:
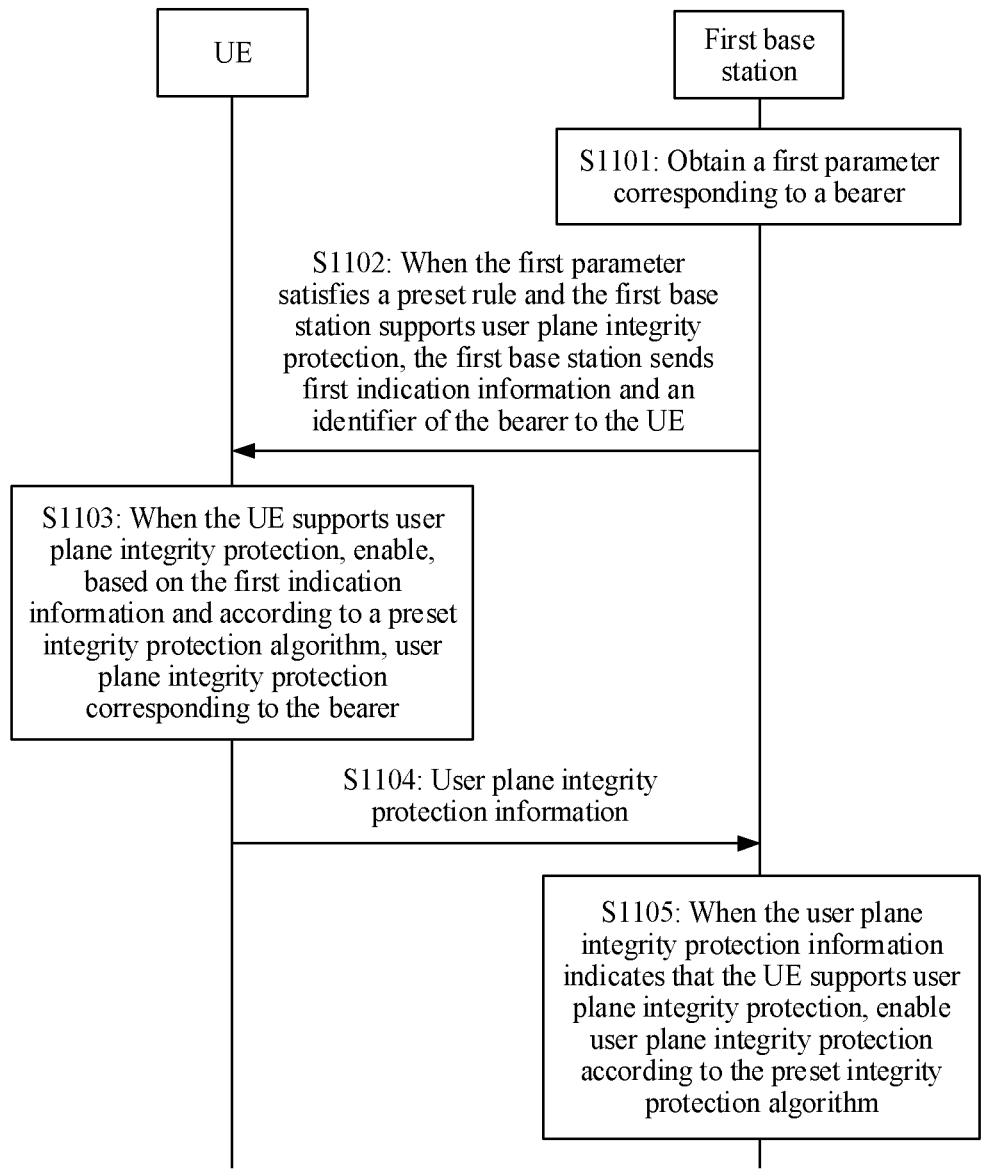
FIG. 11 is a schematic flowchart of another user plane integrity protection method according to this application.

FIG. 11 is a schematic flowchart 1 of another user plane integrity protection method according to this application. Referring to FIG. 11, the method may include the following steps.

S1101: A first base station obtains a first parameter corresponding to a bearer.

It should be noted that the bearer in this application is a bearer between the first base station and UE.

Optionally, the bearer may be a dedicated bearer between the first base station and the UE. In addition, before S1101, the dedicated bearer between the first base station and the UE needs to be first created. The following describes in detail a process of creating the dedicated bearer between the first base station and the UE.

Optionally, setup of the dedicated bearer between the UE and the first base station may be triggered by a PDN gateway (PGW) or the UE.

Optionally, the PGW includes a preset policy. When uplink data sent by the UE and received by the PGW satisfies the preset policy, the PGW may trigger setup of the dedicated bearer between the UE and the first base station.

Optionally, the UE includes the preset policy. When to-be-sent user plane information of the UE satisfies the preset policy, the UE may trigger setup of the dedicated bearer between the UE and the first base station. Optionally, the preset policy may be preconfigured on the UE, or may be generated by the UE when the UE obtains an IP address of a DNS.

It should be noted that, before S1101, a default bearer has been set up between the UE and a mobility management entity, and the UE may send uplink data to the PGW through the default bearer.

Optionally, the preset policy may be used to indicate that the user plane information to be sent by the UE is a DNS message.

In an implementation, the preset policy may include a 5-tuple identifier, and a target IP address in the 5-tuple identifier is the IP address of the DNS server. When a target IP address in the user plane information (uplink data) sent by the UE to the PGW is the IP address of the DNS server, it is determined that the user plane information satisfies the preset policy.

In another implementation, the user plane information (uplink data) sent by the UE may be identified according to the preset policy. For example, a User Datagram Protocol (UDP) port number of the user plane information sent by the UE may be identified according to the preset policy. If the UDP port number of the user plane information sent by the UE is identified as 53 according to the preset policy, it is determined that the user plane information satisfies the preset policy.

Optionally, the preset policy may be a policy control and charging (PCC) rule.

Optionally, in a process in which the PGW triggers setup of the dedicated bearer, the PGW sends a create bearer request message to a service gateway (SGW). The bearer setup request message includes a traffic flow template (TFT) and an EPS bearer quality of service (QoS) parameter. The SGW sends the create bearer request message to the mobility management entity.

The MME constructs a NAS message. For example, the NAS message may be a session management request message, and the NAS message includes the TFT. The mobility management entity further constructs an S1 message. For example, the S1 message may be the bearer setup request message, and the S1 message includes the EPS bearer QoS parameter. The EPS bearer QoS parameter includes a specific QoS class identifier (QCI. The MME sends, to the first base station, the S1 message that carries the NAS message.

Optionally, in a process in which the UE triggers setup of the dedicated bearer, the UE sends a requested bearer resource allocation message to the mobility management entity. The requested bearer resource allocation message includes the TFT and the QCI. The mobility management entity sends a bearer resource command message to the PGW through the SGW, where the bearer resource command message includes the TFT and the QCI. The PGW detects the TFT and the QCI according to a local policy, or requests a policy and charging rules function (PCRF) entity to detect the TFT and the QCI, to determine whether a dedicated bearer can be created for the UE. When the PGW determines to create a dedicated bearer for the UE, the PGW sends a create bearer request message to the SGW, where the bearer setup request message includes the TFT and the EPS bearer QoS parameter. The SGW sends the create bearer request message to the mobility management entity. The mobility management entity constructs a NAS message including the TFT and an S1 message including the EPS bearer QoS parameter, where the EPS bearer QoS parameter includes the QCI. The mobility management entity sends, to the first base station, the S1 message that carries the NAS message.

Optionally, the first base station may obtain the first parameter of the bearer from the S1 message. The first parameter may be the EPS bearer QoS parameter included in the S1 message, or may be the QCI in the EPS bearer QoS parameter.

S1102: When the first parameter satisfies a preset rule and the first base station supports user plane integrity protection, the first base station sends first indication information and an identifier of the bearer to the UE.

Optionally, when the first parameter is the QCI, the first base station determines whether the QCI is a preset value. If the QCI is the preset value, the first base station determines that the first parameter satisfies the preset rule.

For example, the preset value may be 76, 81, or the like. Certainly, in an actual application process, the preset value may be set based on an actual requirement. This is not limited in this application.

The first indication information is used to indicate the UE to enable user plane integrity protection for the bearer according to a preset integrity protection algorithm. The bearer is used to transmit user plane data that matches first flow matching information corresponding to the bearer.

Before S1102, the first base station and the UE have completed an AS SMC procedure. In addition, a control plane integrity protection algorithm of the first base station and the UE is determined in the AS SMC procedure.

Optionally, the control plane integrity protection algorithm of the first base station and the UE may be determined as the preset integrity protection algorithm.

Optionally, when the first parameter indicates that the bearer is a preset bearer, the first base station may send the first indication information and the identifier of the bearer to the UE. The preset bearer may be a preset dedicated bearer for which user plane integrity protection needs to be performed.

S1103: When the UE supports user plane integrity protection, the UE enables, based on the first indication information and according to the preset integrity protection algorithm, user plane integrity protection corresponding to the bearer.

Before S1102, the first base station and the UE have completed an AS SMC procedure. In addition, a control plane integrity protection algorithm of the first base station and the UE is determined in the AS SMC procedure.

Optionally, the control plane integrity protection algorithm of the first base station and the UE may be determined as the preset integrity protection algorithm.

After the UE enables user plane integrity protection, the UE may perform, according to the preset integrity protection algorithm, integrity protection on the user plane information (or the user plane data) that corresponds to the bearer and that is to be sent to the first base station. Correspondingly, after the UE receives user plane information that corresponds to the bearer and that is sent by the first base station, the UE may further perform, according to a user plane integrity protection algorithm, integrity verification on the received user plane information corresponding to the bearer.

Optionally, the UE may obtain the first flow matching information. For example, the UE may obtain the first flow matching information from the NAS message sent by the first base station, or may obtain, at a preset storage location, the first flow matching information that is prestored. The first flow matching information prestored at the preset storage location is stored by the UE after the UE obtains the first flow matching information in a previous processing procedure.

Optionally, after the UE enables user plane integrity protection, when the user plane information to be sent by the UE matches the first flow matching information, the UE performs integrity protection on the user plane information according to the preset integrity protection algorithm. The UE sends the user plane information on which user plane integrity protection has been performed to the first base station over a bearer corresponding to the first flow matching information (a bearer indicated by the identifier of the bearer that is sent by the first base station and received by the UE).

It should be noted that the UE does not perform user plane integrity protection on the user plane information that does not match the first flow matching information, and does not send the user plane information to the first base station over the bearer corresponding to the first flow matching information.

For example, when the first flow matching information indicates that the target IP address is the IP address of the DNS server, a target IP address of a data packet (a query data packet) sent by the UE during a DNS query is the IP address of the DNS server. Because the target IP address of the query data packet is the IP address of the DNS server, it is determined that the query data packet matches the first flow matching information. In this case, the UE performs user plane integrity protection on the query data packet according to the preset integrity protection algorithm, and sends the query data packet to the first base station over the bearer corresponding to the first flow matching information.

S1104: The UE sends user plane integrity protection information to the first base station.

The user plane integrity protection information is used to indicate whether the UE supports user plane integrity protection.

It should be noted that for a process of performing S1104, refer to S201. Details are not described herein again in this application.

It should be noted that S1103 and S1104 are not sequential. S1103 and S1104 may be performed in sequence or in parallel. When S1103 and S1104 are performed in sequence, S1104 may alternatively be performed before S1103.

S1105: When the user plane integrity protection information indicates that the UE supports user plane integrity protection, the first base station enables user plane integrity protection according to the preset integrity protection algorithm.

It should be further noted that the UE may alternatively enable user plane integrity protection corresponding to the bearer at any moment from S1102 to S1105. A moment at which the UE enables user plane integrity protection is not limited in this application.

After the first base station enables user plane integrity protection, the first base station may perform, according to the preset integrity protection algorithm, integrity protection on user plane information that corresponds to the bearer and that is to be sent to the UE. Correspondingly, after the first base station receives the user plane information that corresponds to the bearer and that is sent by the UE, the first base station may further perform, according to the preset integrity protection algorithm, integrity verification on the received user plane information corresponding to the bearer.

According to the user plane integrity protection method provided in this application, when the first base station determines that user plane integrity protection corresponding to a bearer needs to be enabled, the first base station sends first indication information and a bearer identifier of the bearer to the UE, to indicate the UE to enable, according to a preset user plane integrity protection algorithm, user plane integrity protection corresponding to the bearer. When the UE supports user plane integrity protection, the UE enables user plane integrity protection corresponding to the bearer. The first base station may further obtain user plane integrity protection information of the UE, to determine whether the UE supports user plane integrity protection. When determining that the UE also supports user plane integrity protection, the first base station enables user plane integrity protection corresponding to the bearer. It can be learned from the foregoing that, the first base station may negotiate with the UE, and when both the first base station and the UE support user plane integrity protection, the first base station and the UE enable user plane integrity protection according to the same user plane integrity protection algorithm, to implement a user plane integrity protection procedure on a radio air interface between the first base station and the UE.

In an actual application process, in a plurality of application scenarios (for example, a scenario in which the UE is connected to a single base station, a scenario in which handover is performed between base stations, and a scenario in which the UE is connected to two base stations), the first base station may negotiate with the UE for user plane integrity protection, to implement the user plane integrity protection procedure between the first base station and the UE. When application scenarios are different, negotiation processes between the first base station and the UE are also different. The following describes in detail negotiation processes between the first base station and the UE for user plane integrity protection in different application scenarios. For details, refer to embodiments shown in FIG. 12 and FIG. 16.

Figure 12:
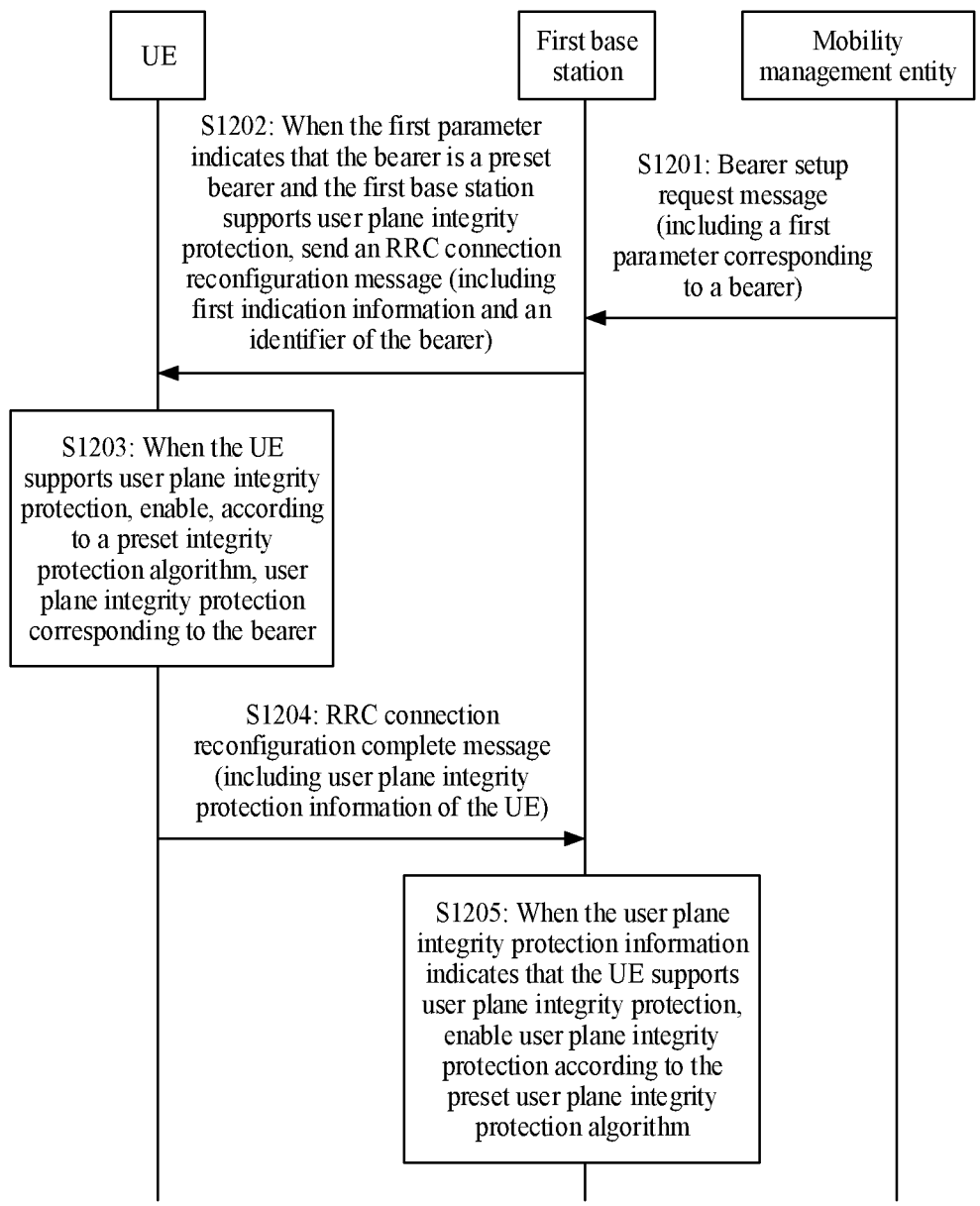
FIG. 12 is a schematic flowchart of another user plane integrity protection method according to this application.

The following describes in detail, using the embodiment shown in FIG. 12, a negotiation process between UE and a first base station for performing user plane integrity protection in a scenario of an unimproved core network when the UE is connected to a single base station (the first base station).

FIG. 12 is a schematic flowchart 2 of another user plane integrity protection method according to this application. Referring to FIG. 12, the method may include the following steps.

S1201: A mobility management entity sends a bearer setup request message to a first base station.

The bearer setup request message includes a first parameter corresponding to a bearer. The bearer setup request message may further include a NAS message, where the NAS message includes the first flow matching information.

Optionally, the first parameter may be a QCI in an EPS bearer QoS parameter of the bearer.

Optionally, the first flow matching information may be a TFT.

S1202: When the first parameter indicates that the bearer is a preset bearer and the first base station supports user plane integrity protection, the first base station sends an RRC connection reconfiguration message to UE.

The RRC connection reconfiguration message includes first indication information and an identifier of the bearer. The RRC connection reconfiguration message may further include the NAS message, where the NAS message includes the first flow matching information. The first indication information is used to indicate the UE to enable user plane integrity protection for the bearer according to a preset integrity protection algorithm.

Optionally, the first base station may determine the identifier of the bearer based on the first parameter.

S1203: When the UE supports user plane integrity protection, the UE enables, according to the preset integrity protection algorithm, user plane integrity protection corresponding to the bearer.

It should be noted that after the UE enables user plane integrity protection corresponding to the bearer, when the UE sends uplink data, if the UE determines that the uplink data satisfies the first flow matching information, the UE performs user plane integrity protection on the uplink data according to the preset integrity protection algorithm, and sends, over a bearer corresponding to the first flow matching information, the uplink data on which user plane integrity protection has been performed. Correspondingly, when the UE receives, over the bearer, downlink data sent by the base station, the UE performs user plane integrity verification on the downlink data according to the preset integrity protection algorithm.

S1204: The UE sends an RRC connection reconfiguration complete message to the first base station. The RRC connection reconfiguration complete message includes user plane integrity protection information of the UE.

It should be noted that S1203 and S1204 are not sequential. S1203 and S1204 may be performed in sequence or in parallel. When S1203 and S1204 are performed in sequence, S1204 may alternatively be performed before S1203.

S1205: When the user plane integrity protection information indicates that the UE supports user plane integrity protection, the first base station enables user plane integrity protection according to the preset user plane integrity protection algorithm.

In the embodiment shown in FIG. 12, the first base station may directly obtain the user plane integrity protection information of the UE from the UE, to determine whether the UE supports user plane integrity protection. The first base station negotiates with the UE in an RRC connection setup procedure such that when both the first base station and the UE support user plane integrity protection, the first base station and the UE enable user plane integrity protection according to the same user plane integrity protection algorithm, to implement a user plane integrity protection procedure on a radio air interface between the first base station and the UE.

Figure 13:
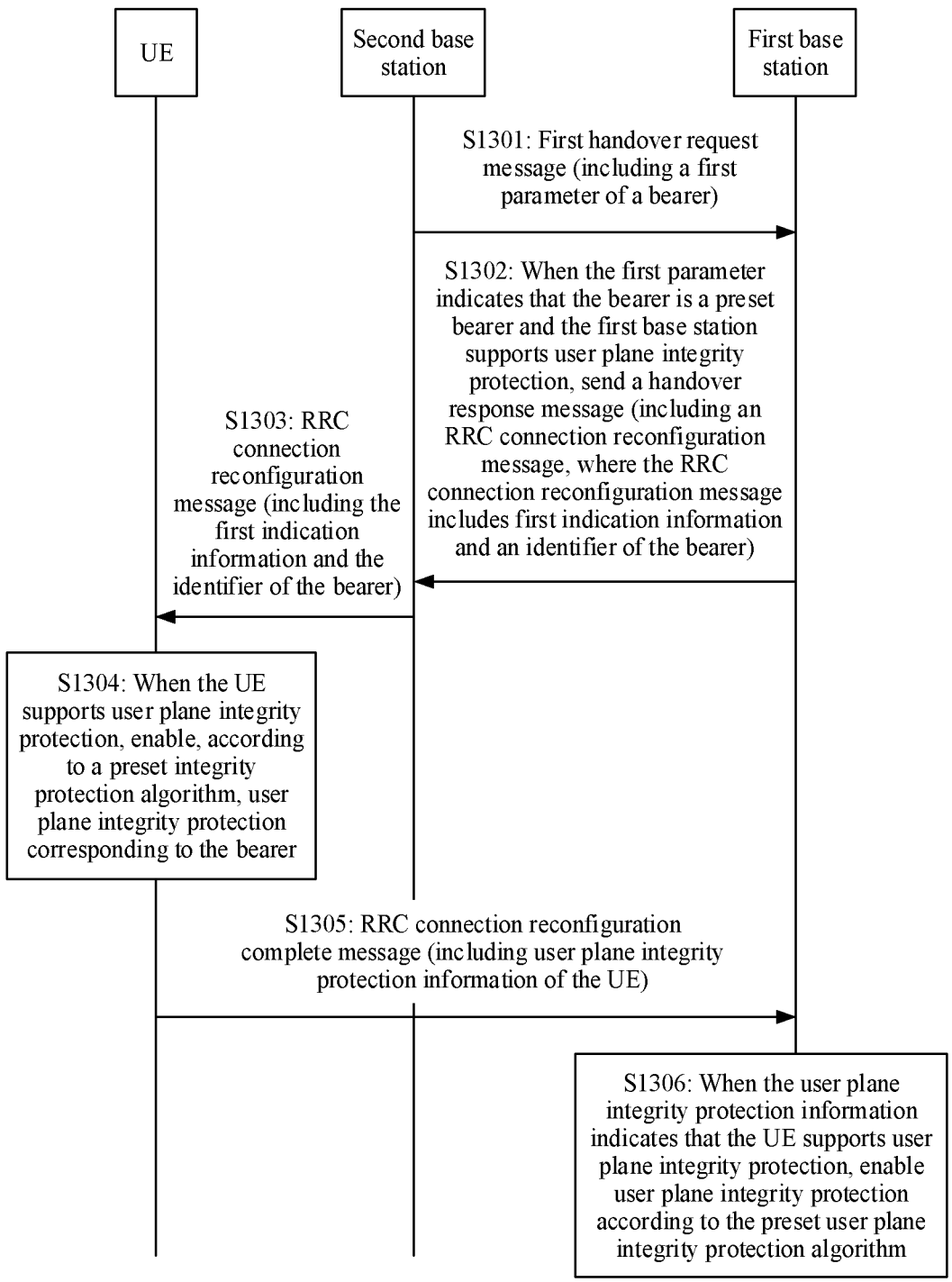
FIG. 13 is a schematic flowchart of another user plane integrity protection method according to this application.

The following describes in detail, using the embodiment shown in FIG. 13, a negotiation process between UE and a first base station for performing user plane integrity protection in a scenario of an unimproved core network when the UE is connected to two base stations (the first base station and a second base station) and there is a communications interface between the first base station and the second base station.

FIG. 13 is a schematic flowchart 3 of another user plane integrity protection method according to this application. Referring to FIG. 13, the method may include the following steps.

S1301: A second base station sends a first handover request message to a first base station. The first handover request message includes a first parameter of a bearer.

S1302: When the first parameter indicates that the bearer is a preset bearer and the first base station supports user plane integrity protection, the first base station sends a handover response message to the second base station. The handover response message includes an RRC connection reconfiguration message, and the RRC connection reconfiguration message includes first indication information and an identifier of the bearer.

S1303: The second base station sends the RRC connection reconfiguration message to UE. The RRC connection reconfiguration message includes the first indication information and the identifier of the bearer.

S1304: When the UE supports user plane integrity protection, the UE enables, according to a preset integrity protection algorithm, user plane integrity protection corresponding to the bearer.

It should be noted that after the UE enables user plane integrity protection corresponding to the bearer, when the UE sends uplink data, if the UE determines that the uplink data satisfies first flow matching information, the UE performs user plane integrity protection on the uplink data according to the preset integrity protection algorithm, and sends, over a bearer corresponding to the first flow matching information, the uplink data on which user plane integrity protection has been performed. Correspondingly, when the UE receives, over the bearer, downlink data sent by the base station, the UE performs user plane integrity verification on the downlink data according to the preset integrity protection algorithm.

S1305: The UE sends an RRC connection reconfiguration complete message to the first base station. The RRC connection reconfiguration complete message includes user plane integrity protection information of the UE.

S1306: When the user plane integrity protection information indicates that the UE supports user plane integrity protection, the first base station enables user plane integrity protection according to the preset user plane integrity protection algorithm.

In the embodiment shown in FIG. 13, the first base station may obtain the user plane integrity protection information of the UE through the second base station from the UE, to determine whether the UE supports user plane integrity protection. The first base station negotiates with the UE such that when both the first base station and the UE support user plane integrity protection, the first base station and the UE enable user plane integrity protection according to the same user plane integrity protection algorithm, to implement a user plane integrity protection procedure on a radio air interface between the first base station and the UE.

Figure 14A:
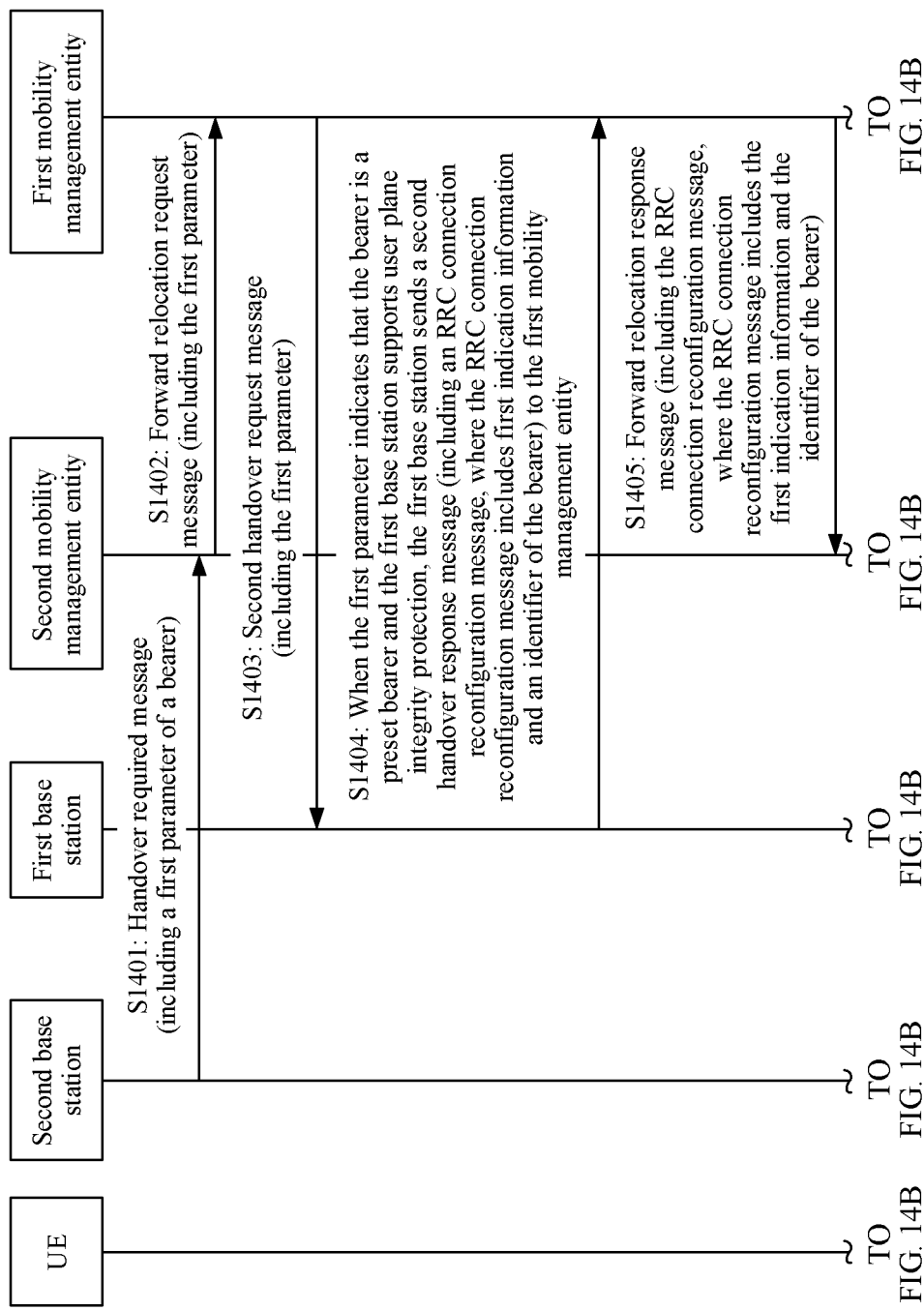
FIG. 14A and FIG. 14B are a schematic flowchart of another user plane integrity protection method according to this application.
Figure 14B:
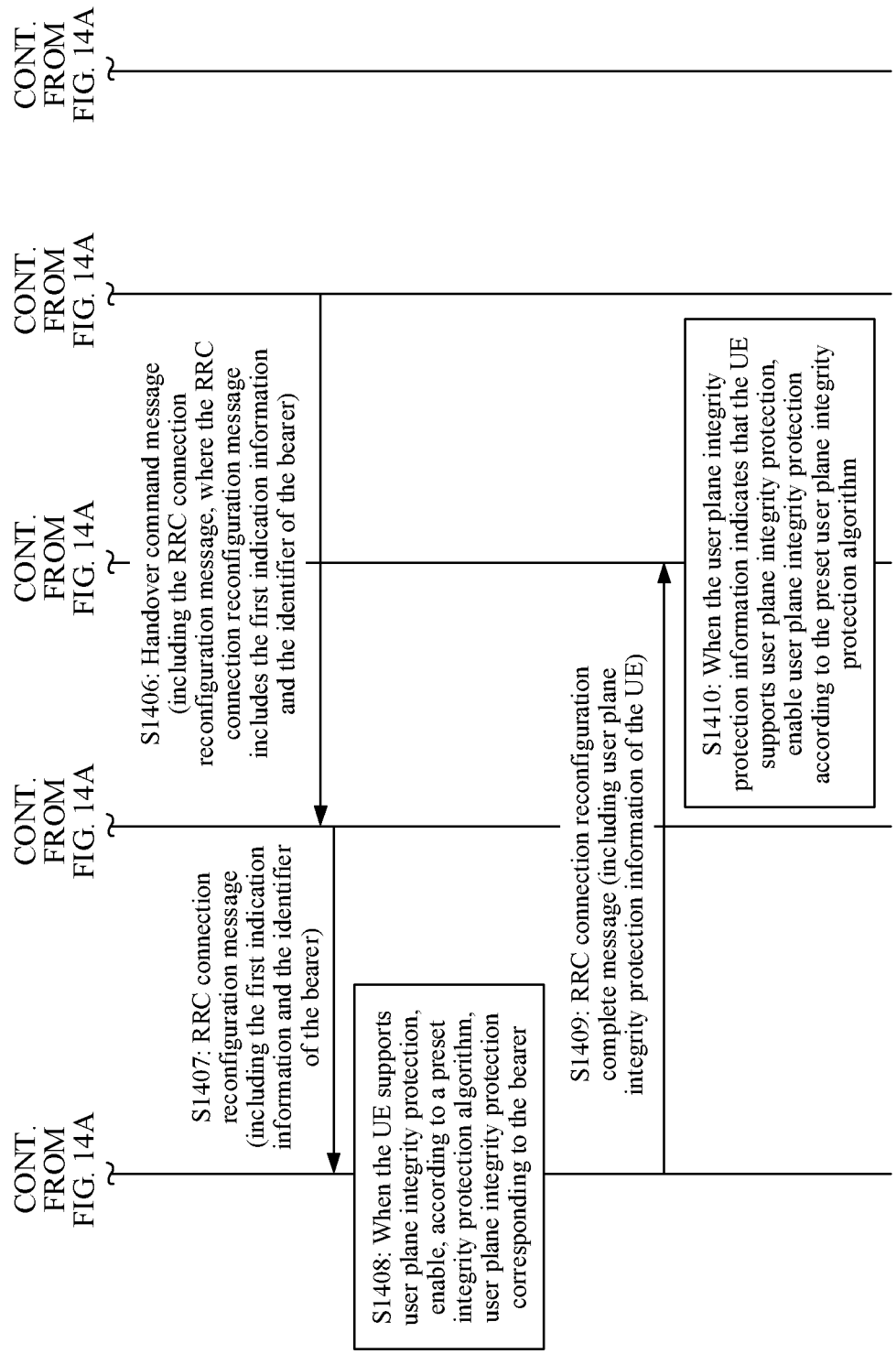

The following describes in detail, using the embodiment shown in FIG. 14A and FIG. 14B, a negotiation process between UE and a first base station for performing user plane integrity protection in a scenario of an unimproved core network when the UE is connected to two base stations (the first base station and a second base station) and there is no communications interface between the first base station and the second base station.

FIG. 14A and FIG. 14B are a schematic flowchart 4 of another user plane integrity protection method according to this application. Referring to FIG. 14A and FIG. 14B, the method may include the following steps.

S1401: A second base station sends a handover required message to a second mobility management entity. The handover required message includes a first parameter of a bearer.

S1402: The second mobility management entity sends a forward relocation request message to a first mobility management entity. The forward relocation request message includes the first parameter.

S1403: The first mobility management entity sends a second handover request message to the first base station. The second handover request message includes the first parameter.

S1404: When the first parameter indicates that the bearer is a preset bearer and the first base station supports user plane integrity protection, the first base station sends a second handover response message to the first mobility management entity. The second handover response message includes an RRC connection reconfiguration message, and the RRC connection reconfiguration message includes first indication information and an identifier of the bearer.

Optionally, the first base station may first construct the RRC connection reconfiguration message that includes the first indication information and the identifier of the bearer, and then include the RRC connection reconfiguration message in the second handover response message and send the second handover response message to the first mobility management entity.

S1405: The first mobility management entity sends a forward relocation response message to the second mobility management entity. The forward relocation response message includes the RRC connection reconfiguration message.

S1406: The second mobility management entity sends a handover command message to the second base station. The handover command message includes the RRC connection reconfiguration message.

S1407: The second base station sends the RRC connection reconfiguration message to UE.

S1408: When the UE supports user plane integrity protection, the UE enables, according to a preset integrity protection algorithm, user plane integrity protection corresponding to the bearer.

S1409: The UE sends an RRC connection reconfiguration complete message to the first base station. The RRC connection reconfiguration complete message includes user plane integrity protection information of the UE.

S1410: When the user plane integrity protection information indicates that the UE supports user plane integrity protection, the first base station enables user plane integrity protection according to the preset user plane integrity protection algorithm.

In the embodiment shown in FIG. 14A and FIG. 14B, the first base station may obtain the user plane integrity protection information of the UE from the UE through the second base station, the first mobility management entity, and the second mobility management entity, to determine whether the UE supports user plane integrity protection. The first base station negotiates with the UE such that when both the first base station and the UE support user plane integrity protection, the first base station and the UE enable user plane integrity protection according to the same user plane integrity protection algorithm, to implement a user plane integrity protection procedure on a radio air interface between the first base station and the UE.

Figure 15:
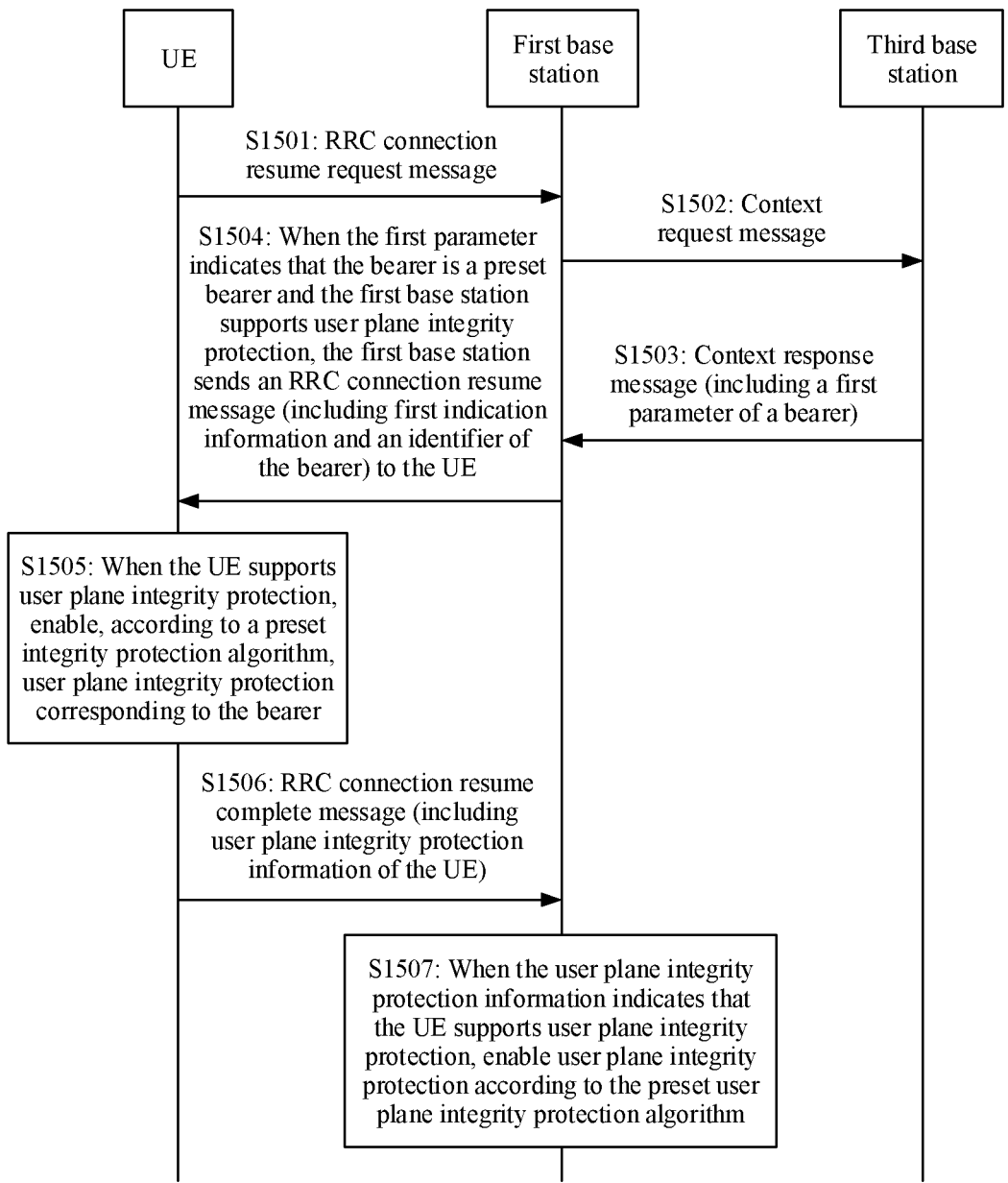
FIG. 15 is a schematic flowchart of another user plane integrity protection method according to this application.

The following describes in detail, using the embodiment shown in FIG. 15, a negotiation process between UE and a first base station for performing user plane integrity protection in a scenario of an unimproved core network when the UE is suspended after completing a user plane integrity protection procedure with a third base station and then resumes a connection to the first base station.

FIG. 15 is a schematic flowchart 5 of another user plane integrity protection method according to this application. Referring to FIG. 15, the method may include the following steps.

S1501: UE sends an RRC connection resume request message to a first base station.

S1502: The first base station sends a context request message to a third base station.

S1503: The third base station sends a context response message to the first base station. The context response message includes a first parameter of a bearer.

S1504: When the first parameter indicates that the bearer is a preset bearer and the first base station supports user plane integrity protection, the first base station sends an RRC connection resume message to UE. The RRC connection resume message includes first indication information and an identifier of the bearer.

Optionally, the first base station may first construct the RRC connection resume message that includes the first indication information and the identifier of the bearer, and then send the RRC connection resume message.

S1505: When the UE supports user plane integrity protection, the UE enables, according to a preset integrity protection algorithm, user plane integrity protection corresponding to the bearer.

S1506: The UE sends an RRC connection resume complete message to the first base station. The RRC connection resume complete message includes user plane integrity protection information of the UE.

S1507: When the user plane integrity protection information indicates that the UE supports user plane integrity protection, the first base station enables user plane integrity protection according to the preset user plane integrity protection algorithm.

In the embodiment shown in FIG. 15, the first base station may obtain the user plane integrity protection information of the UE through the third base station, to determine whether the UE supports user plane integrity protection. The first base station negotiates with the UE such that when both the first base station and the UE support user plane integrity protection, the first base station and the UE enable user plane integrity protection according to the same user plane integrity protection algorithm, to implement a user plane integrity protection procedure on a radio air interface between the first base station and the UE.

Figure 16:
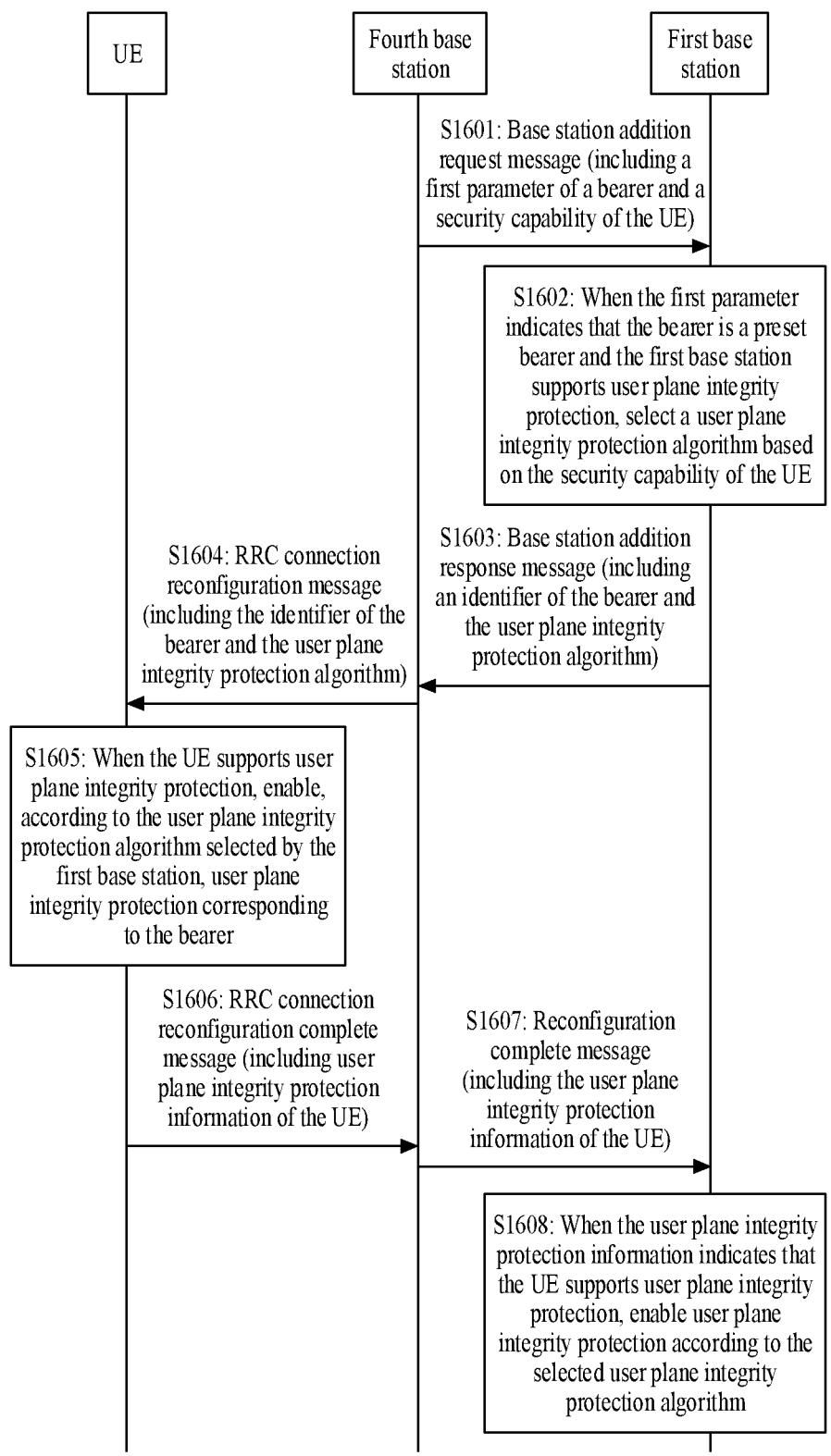
FIG. 16 is a schematic flowchart of another user plane integrity protection method according to this application.

The following describes in detail, using the embodiment shown in FIG. 16, a negotiation process between UE and a first base station for performing user plane integrity protection in a scenario of an unimproved core network when the UE is connected to two base stations (the first base station and a fourth base station).

FIG. 16 is a schematic flowchart 6 of another user plane integrity protection method according to this application. Referring to FIG. 16, the method may include the following steps.

S1601: A fourth base station sends a base station addition request message to a first base station. The base station addition request message includes a first parameter of a bearer and a security capability of UE.

S1602: When the first parameter indicates that the bearer is a preset bearer and the first base station supports user plane integrity protection, the first base station selects a user plane integrity protection algorithm based on the security capability of the UE.

Optionally, the first base station may obtain, from the security capability of the UE, a first integrity protection algorithm set supported by the UE, and further obtain a second integrity protection algorithm set supported by the first base station. The first base station selects at least one integrity protection algorithm from the first integrity protection algorithm set and the second integrity protection algorithm set, where the selected at least one integrity protection algorithm is an integrity protection algorithm included in both the first integrity protection algorithm set and the second integrity protection algorithm set.

If one integrity protection algorithm is selected, the integrity protection algorithm is determined as the user plane integrity protection algorithm.

If more than one integrity protection algorithm is selected, the user plane integrity protection algorithm may be determined from the at least one integrity protection algorithm based on a priority, a security level, and the like of the at least one integrity protection algorithm. For example, an integrity protection algorithm with a highest priority may be determined as the user plane integrity protection algorithm, or an integrity protection algorithm with a highest security level may be determined as the user plane integrity protection algorithm.

It should be noted that the foregoing merely describes an example method for determining a user plane integrity protection algorithm by the first base station, but does not limit the method for determining a user plane integrity protection algorithm. In an actual application process, a method for determining a user plane integrity protection algorithm may be selected based on an actual requirement. This is not limited in this application.

S1603: The first base station sends a base station addition response message to the fourth base station. The base station addition response message includes an identifier of the bearer and the user plane integrity protection algorithm that is selected by the first base station.

S1604: The fourth base station sends an RRC connection reconfiguration message to the UE. The RRC connection reconfiguration message includes the identifier of the bearer and the user plane integrity protection algorithm that is selected by the first base station.

S1605: When the UE supports user plane integrity protection, the UE enables, according to the user plane integrity protection algorithm selected by the first base station, user plane integrity protection corresponding to the bearer.

S1606: The UE sends an RRC connection reconfiguration complete message to the fourth base station. The RRC connection reconfiguration complete message includes user plane integrity protection information of the UE.

S1607: The fourth base station sends a base station reconfiguration complete message to the first base station. The reconfiguration complete message includes the user plane integrity protection information of the UE.

It should be noted that, after S1607, a random-access process may be performed between the UE and the first base station.

S1608: When the user plane integrity protection information indicates that the UE supports user plane integrity protection, the first base station enables user plane integrity protection according to the selected user plane integrity protection algorithm.

In the embodiment shown in FIG. 16, the first base station may obtain the user plane integrity protection information of the UE through the fourth base station, to determine whether the UE supports user plane integrity protection. The first base station negotiates with the UE such that when both the first base station and the UE support user plane integrity protection, the first base station and the UE enable user plane integrity protection according to the same user plane integrity protection algorithm, to implement a user plane integrity protection procedure on a radio air interface between the first base station and the UE.

Figure 17:
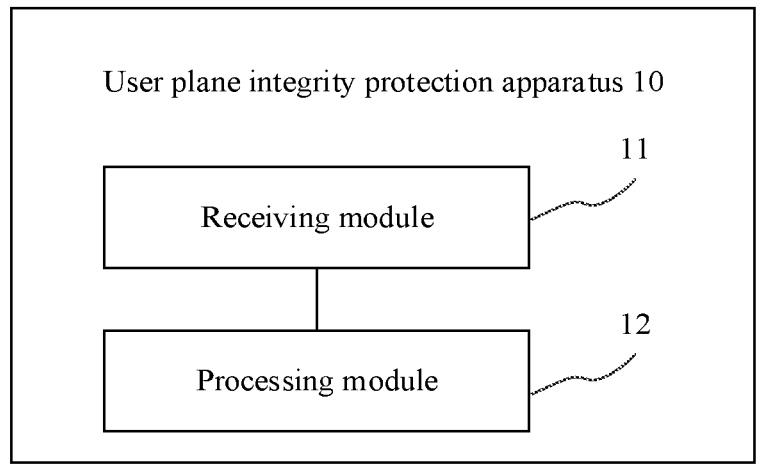
FIG. 17 is a schematic structural diagram of a user plane integrity protection apparatus according to this application.

FIG. 17 is a schematic structural diagram 1 of a user plane integrity protection apparatus 10 according to this application. Referring to FIG. 17, the user plane integrity protection apparatus 10 may include a receiving module 11 and a processing module 12.

The receiving module 11 is configured to obtain user plane integrity protection information of UE.

The processing module 12 is configured to when a first base station supports user plane integrity protection and the user plane integrity protection information indicates that the UE supports user plane integrity protection, enable user plane integrity protection according to a user plane integrity protection algorithm.

Optionally, the receiving module 11 may perform S201 in the embodiment in FIG. 2, S304 in the embodiment in FIG. 3, S404 in the embodiment in FIG. 4, S502 in the embodiment in FIG. 5, S601 in the embodiment in FIG. 6, S703 in the embodiment in FIG. 7, S802 in the embodiment in FIG. 8, S902 in the embodiment in FIG. 9, and S1002 in the embodiment in FIG. 10.

Optionally, the processing module 12 may perform S203 in the embodiment in FIG. 2, S306 in the embodiment in FIG. 3, S406 in the embodiment in FIG. 4, S504 in the embodiment in FIG. 5, S603 in the embodiment in FIG. 6, S705 in the embodiment in FIG. 7, S804 in the embodiment in FIG. 8, S905 in the embodiment in FIG. 9, and S1009 in the embodiment in FIG. 10.

The user plane integrity protection apparatus provided in this embodiment of the present disclosure may perform the technical solutions shown in the foregoing method embodiments. An implementation principle and a beneficial effect of the user plane integrity protection apparatus are similar to those in the method embodiments. Details are not described herein again.

Figure 18:
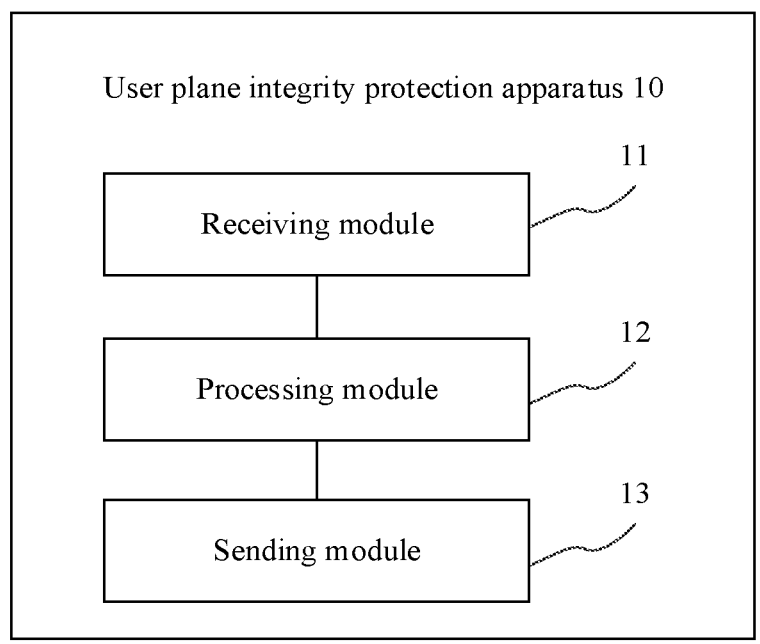
FIG. 18 is a schematic structural diagram of a user plane integrity protection apparatus according to this application.

FIG. 18 is a schematic structural diagram 2 of a user plane integrity protection apparatus according to this application. On the basis of the embodiment shown in FIG. 17, referring to FIG. 18, the apparatus further includes a sending module 13.

The sending module 13 is configured to send first information to the UE.

The first information includes the user plane integrity protection algorithm, or the first information is used to indicate the UE to enable user plane integrity protection according to a preset integrity protection algorithm.

Optionally, the sending module 13 may perform S307 in the embodiment in FIG. 3, S405 in the embodiment in FIG. 4, S505 in the embodiment in FIG. 5, S605 in the embodiment in FIG. 6, S706 in the embodiment in FIG. 7, and S805 in the embodiment in FIG. 8.

In a possible implementation, the preset integrity protection algorithm is the same as a control plane integrity protection algorithm of the first base station and the UE.

In another possible implementation, the receiving module 11 is further configured to receive an initial context request message sent by a mobility management entity. The initial context request message includes the user plane integrity protection information of the UE.

In another possible implementation, the sending module 13 is further configured to send an access stratum security mode command message to the UE. The access stratum security mode command message includes the first information.

In another possible implementation, the receiving module 11 is further configured to receive a first handover request message sent by a second base station. The first handover request message includes the user plane integrity protection information of the UE. The first base station is a base station to which the UE is to be handed over, and the second base station is a base station accessed by the UE.

In another possible implementation, the sending module 13 is further configured to send a first handover response message to the second base station. The first handover response message includes the first information, and the first handover response message is used to indicate the second base station to send a RRC connection reconfiguration message including the first information to the UE.

In another possible implementation, the receiving module 11 is further configured to receive a second handover request message sent by a first mobility management entity. The second handover request message includes the user plane integrity protection information.

In another possible implementation, the sending module 13 is further configured to send a second handover response message to the first mobility management entity. The second handover response message includes the first information, and the second handover response message is used to indicate the first mobility management entity to send a forward relocation response message including the first information to a second mobility management entity. The forward relocation response message is used to enable the second mobility management entity to send a first handover command message including the first information to a third base station. The first handover command message is used to indicate the third base station to send a second handover command message including the first information to the UE.

The first base station is a base station to which the UE is to be handed over, and the third base station is a base station accessed by the UE.

In another possible implementation, the receiving module 11 is further configured to receive a bearer setup request message sent by a mobility management entity. The bearer setup request message includes the user plane integrity protection information of the UE.

In another possible implementation, the receiving module 11 is further configured to receive an access stratum security mode complete message sent by the UE. The access stratum security mode complete message includes the user plane integrity protection information of the UE.

In another possible implementation, the sending module 13 is further configured to send an RRC connection reconfiguration message to the UE. The RRC connection reconfiguration message includes the first information.

In another possible implementation, the receiving module 11 is further configured to receive a base station addition request message sent by a fourth base station. The base station addition request message includes the user plane integrity protection information. The base station addition request message is sent by the fourth base station after the fourth base station receives an RRC connection setup message that includes the user plane integrity protection information and that is sent by the UE. The first base station is a secondary base station connected to the UE, and the fourth base station is a master base station connected to the UE.

The sending module is further configured to send a base station addition response message to the fourth base station. The base station addition response message includes the first information, and the base station addition response message is used to enable the second base station to send an RRC connection reconfiguration message including the first information to the UE.

In another possible implementation, the receiving module 11 is further configured to receive an RRC connection reconfiguration complete message sent by the UE. The RRC connection reconfiguration complete message includes the user plane integrity protection information of the UE.

In another possible implementation, the sending module 13 is configured to when the first base station does not support user plane integrity protection and the user plane integrity protection information indicates that the UE supports user plane integrity protection, send first indication information to the UE. The first indication information is used to indicate the UE not to enable user plane integrity protection.

The user plane integrity protection apparatus provided in this embodiment of the present disclosure may perform the technical solutions shown in the foregoing method embodiments. An implementation principle and a beneficial effect of the user plane integrity protection apparatus are similar to those in the method embodiments. Details are not described herein again.

Figure 19:
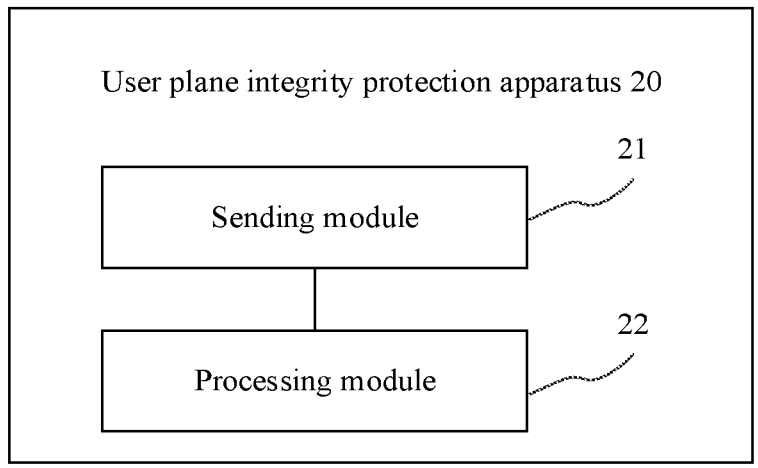
FIG. 19 is a schematic structural diagram of another user plane integrity protection apparatus according to this application.

FIG. 19 is a schematic structural diagram 1 of another user plane integrity protection apparatus according to this application. Referring to FIG. 19, the user plane integrity protection apparatus 20 may include a sending module 21 and a processing module 22.

The sending module 21 is configured to send user plane integrity protection information of UE to a first base station. The user plane integrity protection information is used to indicate whether the UE supports plane integrity protection.

The processing module 22 is configured to when the UE supports user plane integrity protection, enable user plane integrity protection according to a user plane integrity protection algorithm.

Optionally, the sending module 21 may perform S201 in the embodiment in FIG. 2, S301 in the embodiment in FIG. 3, S401 in the embodiment in FIG. 4, S501 in the embodiment in FIG. 5, S802 in the embodiment in FIG. 8, and S902 in the embodiment in FIG. 9.

Optionally, the processing module 22 may perform S202 in the embodiment in FIG. 2, S308 in the embodiment in FIG. 3, S407 in the embodiment in FIG. 4, S506 in the embodiment in FIG. 5, S606 in the embodiment in FIG. 6, S710 in the embodiment in FIG. 7, S806 in the embodiment in FIG. 8, S903 in the embodiment in FIG. 9, and S1006 in the embodiment in FIG. 10.

The user plane integrity protection apparatus provided in this embodiment of the present disclosure may perform the technical solutions shown in the foregoing method embodiments. An implementation principle and a beneficial effect of the user plane integrity protection apparatus are similar to those in the method embodiments. Details are not described herein again.

Figure 20:
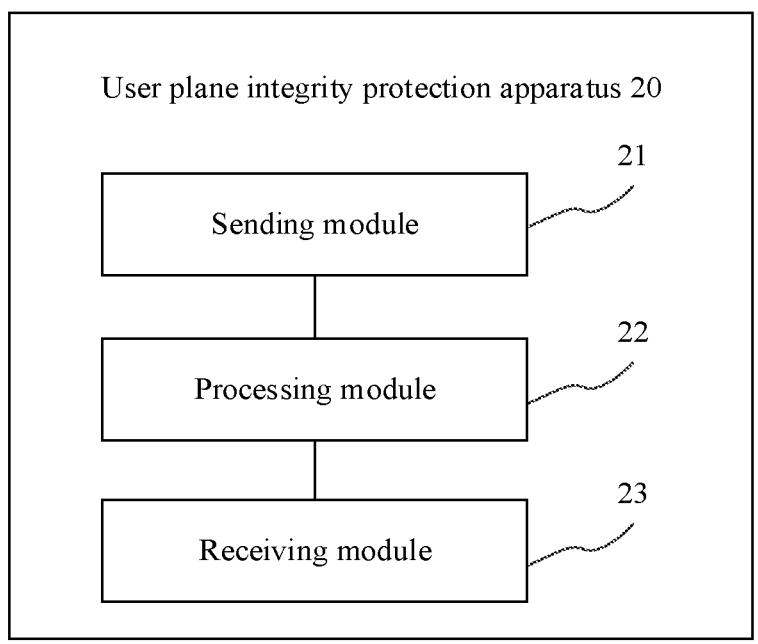
FIG. 20 is a schematic structural diagram of another user plane integrity protection apparatus according to this application.

FIG. 20 is a schematic structural diagram 2 of another user plane integrity protection apparatus according to this application. On the basis of the embodiment shown in FIG. 19, referring to FIG. 20, the apparatus may further include a receiving module 23.

The receiving module 23 is configured to before the processing module 22 enables user plane integrity protection according to the user plane integrity protection algorithm, receive first information sent by the first base station.

The first information includes the user plane integrity information protection algorithm, or the first information is used to indicate the UE to enable user plane integrity protection according to a preset integrity protection algorithm.

Optionally, the receiving module 23 may perform S307 in the embodiment in FIG. 3, S405 in the embodiment in FIG. 4, S505 in the embodiment in FIG. 5, S605 in the embodiment in FIG. 6, S709 in the embodiment in FIG. 7, S805 in the embodiment in FIG. 8, and S1005 in the embodiment in FIG. 10.

In a possible implementation, the preset integrity protection algorithm is the same as a control plane integrity protection algorithm of the first base station and the UE.

In another possible implementation, the sending module 21 is further configured to send a NAS message to a mobility management entity. The NAS message includes the user plane integrity protection information, and the NAS message is used to indicate the mobility management entity to send an initial context request message including the user plane integrity protection information to the first base station.

In another possible implementation, the receiving module 23 is further configured to receive an access stratum security mode command message sent by the first base station. The access stratum security mode command message includes the first information.

In another possible implementation, the sending module 21 is further configured to send a PDN connection request message to a mobility management entity. The PDN connection request message includes the user plane integrity information, and the PDN connection request message is used to indicate the mobility management entity to send a bearer setup request message including the user plane integrity protection information to the first base station.

In another possible implementation, the sending module 21 is further configured to send an access stratum security mode complete message to the first base station. The access stratum security mode complete message includes the user plane integrity protection information.

In another possible implementation, the receiving module 23 is further configured to receive an RRC connection reconfiguration message sent by the first base station. The RRC connection reconfiguration message includes the first information.

In another possible implementation, the sending module 21 is further configured to send, by the UE, an RRC connection setup message to a fourth base station. The RRC connection setup message includes the user plane integrity protection information. The user plane integrity protection information is used to enable the fourth base station to send a base station addition request message including the user plane integrity protection information to the first base station.

The first base station is a secondary base station connected to the UE, and the fourth base station is a master base station connected to the UE.

In another possible implementation, the receiving module 23 is further configured to receive, by the UE, an RRC connection reconfiguration message sent by the fourth base station. The RRC connection reconfiguration message includes the first information, and the RRC connection reconfiguration message is sent by the fourth base station to the UE after the fourth base station receives a base station addition request response message sent by the first base station. The base station addition request response message includes the first information.

In another possible implementation, the sending module 21 is further configured to send, by the UE, the user plane integrity protection information to a second base station. The user plane integrity protection information is used to enable the second base station to send a handover request message including the user plane integrity protection information to the first base station before the UE is handed over from the second base station to the first base station.

In another possible implementation, the receiving module 23 is further configured to receive, by the UE, an RRC connection reconfiguration message sent by the second base station. The RRC connection reconfiguration message includes the first information, and the RRC connection reconfiguration message is sent by the second base station to the UE after the second base station receives a handover response message sent by the first base station. The handover response message includes the first information.

In another possible implementation, the sending module 21 is further configured to send, by the UE, the user plane integrity protection information to a third base station. The user plane integrity protection information is used to enable the third base station to send a handover request message including the user plane integrity protection information to the second mobility management entity before the UE is handed over from the third base station to the first base station. The handover request message is used to enable the second mobility management entity to send a forward relocation response message including the user plane integrity protection information to the first base station.

The first base station is a base station to which the UE is to be handed over, and the third base station is a base station accessed by the UE. The first mobility management entity is a mobility management entity connected to the first base station, and the second mobility management entity is a mobility management entity connected to the third base station.

In another possible implementation, the receiving module 23 is further configured to receive, by the UE, a handover command message sent by the third base station. The handover command message includes the first information. The handover command message is sent by the third base station to the UE after the third base station receives the handover command message sent by the second mobility management entity. The handover command message includes the first information.

In another possible implementation, the user plane integrity protection algorithm is the preset integrity protection algorithm.

In another possible implementation, the preset integrity protection algorithm is the same as a control plane integrity protection algorithm of the first base station and the UE.

In another possible implementation, the receiving module 23 is further configured to after the processing module 22 enables user plane integrity protection according to the user plane integrity protection algorithm, receive an RRC connection reconfiguration message sent by the first base station. The RRC connection reconfiguration message includes first indication information, and the first indication information indicates the UE not to enable user plane integrity protection.

The processing module 22 is further configured to disable user plane integrity protection based on the first indication information.

The user plane integrity protection apparatus provided in this embodiment of the present disclosure may perform the technical solutions shown in the foregoing method embodiments. An implementation principle and a beneficial effect of the user plane integrity protection apparatus are similar to those in the method embodiments. Details are not described herein again.

Figure 21:
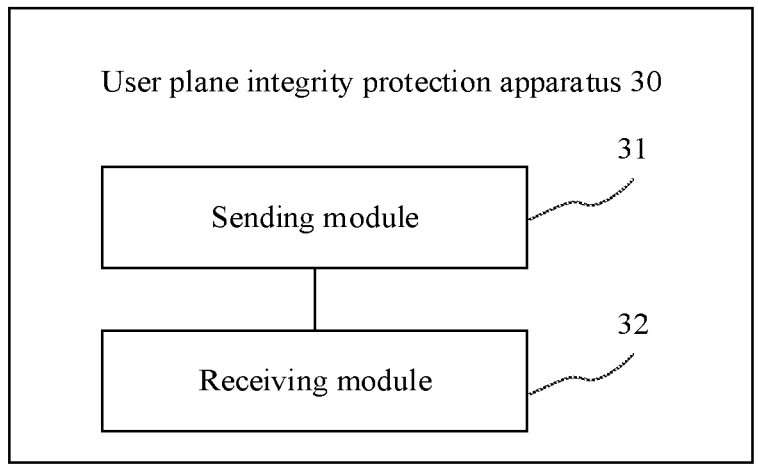
FIG. 21 is a schematic structural diagram of still another user plane integrity protection apparatus according to this application.

FIG. 21 is a schematic structural diagram 1 of still another user plane integrity protection apparatus according to this application. Referring to FIG. 21, the user plane integrity protection apparatus 30 may include a sending module 31 and a processing module 32.

The sending module 31 is configured to send first indication information and an identifier of a bearer to UE. The first indication information is used to indicate the UE to enable user plane integrity protection for the bearer according to a preset integrity protection algorithm. The bearer is used to transmit user plane data that matches first flow matching information corresponding to the bearer.

The receiving module 32 is configured to obtain user plane information of the UE. The user plane information is integrity protected by the UE according to the preset integrity protection algorithm.

Optionally, the sending module 31 may perform S1102 in the embodiment in FIG. 11, S1202 in the embodiment in FIG. 12, S1302 in the embodiment in FIG. 13, S1404 in the embodiment in FIG. 14A and FIG. 14B, S1504 in the embodiment in FIG. 15, and S1603 in the embodiment in FIG. 16.

Optionally, the receiving module 32 may perform S1104 in the embodiment in FIG. 11, S1204 in the embodiment in FIG. 12, S1305 in the embodiment in FIG. 13, S1409 in the embodiment in FIG. 14A and FIG. 14B, S1506 in the embodiment in FIG. 15, and S1607 in the embodiment in FIG. 16.

The user plane integrity protection apparatus provided in this embodiment of the present disclosure may perform the technical solutions shown in the foregoing method embodiments. An implementation principle and a beneficial effect of the user plane integrity protection apparatus are similar to those in the method embodiments. Details are not described herein again.

Figure 22:
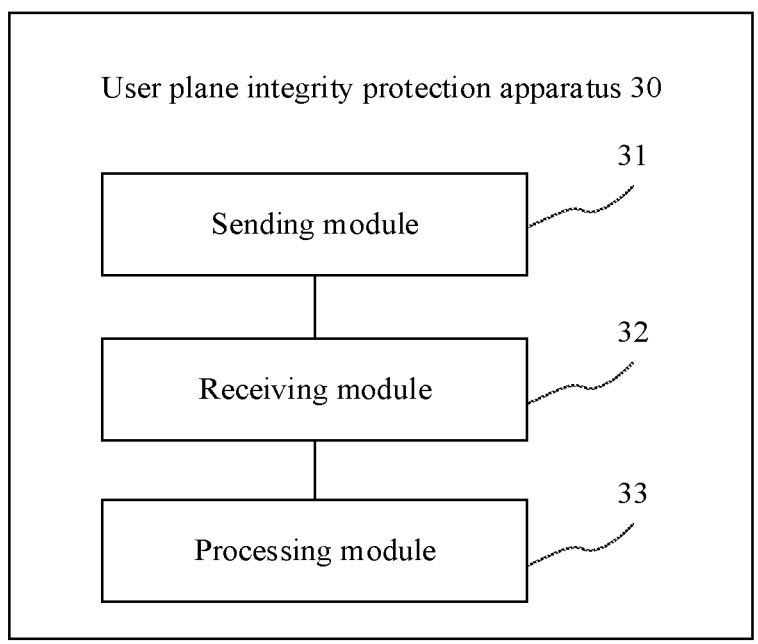
FIG. 22 is a schematic structural diagram of still another user plane integrity protection apparatus according to this application.

FIG. 22 is a schematic structural diagram 2 of still another user plane integrity protection apparatus according to this application. On the basis of FIG. 21, referring to FIG. 22, the apparatus may include a sending module 33.

The processing module 33 is configured to after the receiving module 32 obtains the user plane information of the UE, perform integrity protection verification on the user plane information.

In a possible implementation, the receiving module 32 is further configured to before the sending module 31 sends the first indication information and the identifier of the bearer to the UE, obtain a first parameter corresponding to the bearer.

The sending module 33 is further configured to, if the first parameter satisfies a preset rule, send, by the first base station, the first indication information and the identifier of the bearer to the UE.

In another possible implementation, the first parameter is used to identify the bearer. The sending module 31 is further configured to, when the first parameter indicates a preset bearer, send the first indication information and the identifier of the bearer to the UE.

In another possible implementation, the receiving module 32 is further configured to after the sending module 31 sends the first indication information and the identifier of the bearer to the UE, obtain user plane integrity protection information of the UE. The user plane integrity protection information is used to indicate whether the UE supports user plane integrity protection.

The processing module 33 is further configured to when the user plane integrity protection information indicates that the UE supports user plane integrity protection, enable, according to the preset integrity protection algorithm, user plane integrity protection corresponding to the bearer.

Optionally, the processing module 32 may perform S1105 in the embodiment in FIG. 11, S1205 in the embodiment in FIG. 12, S1306 in the embodiment in FIG. 13, S1410 in the embodiment in FIG. 14A and FIG. 14B, S1507 in the embodiment in FIG. 15, and S1608 in the embodiment in FIG. 16.

In another possible implementation, the receiving module 32 is further configured to receive a bearer setup request message from a mobility management network element. The bearer setup request message includes the first parameter and a NAS message. The NAS message includes the first flow matching information.

The sending module 31 is further configured to send an RRC connection reconfiguration message to the UE. The RRC connection reconfiguration message includes the first indication information, the identifier of the bearer, and the NAS message. The NAS message includes the first flow matching information.

In another possible implementation, the receiving module 32 is further configured to receive a handover request message from a second base station. The handover request message includes the first parameter.

The sending module 31 is further configured to send an RRC connection reconfiguration message to the UE through the second base station. The RRC connection reconfiguration message includes the first indication information and the identifier of the bearer.

In another possible implementation, the receiving module 32 is further configured to receive a context response message from a third base station. The obtained context response message includes the first parameter.

The sending module 31 is further configured to send an RRC connection resume message to the UE. The RRC connection resume message includes the first indication information and the identifier of the bearer.

In another possible implementation, the preset integrity protection algorithm is the same as a control plane integrity protection algorithm of the first base station and the UE.

The user plane integrity protection apparatus provided in this embodiment of the present disclosure may perform the technical solutions shown in the foregoing method embodiments. An implementation principle and a beneficial effect of the user plane integrity protection apparatus are similar to those in the method embodiments. Details are not described herein again.

Figure 23:
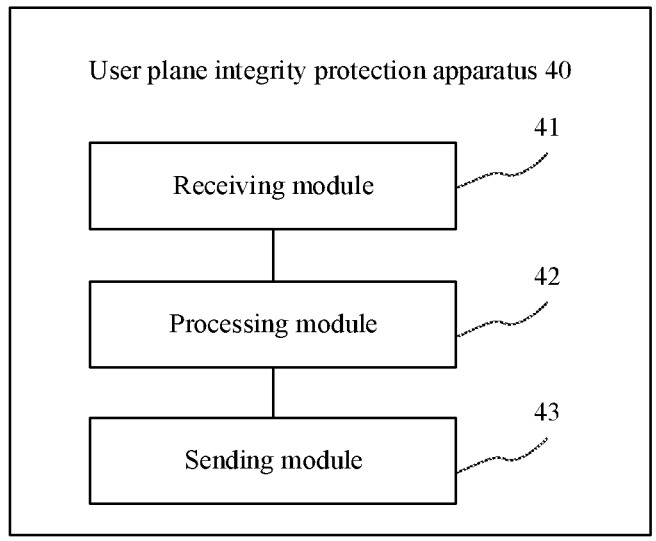
FIG. 23 is a schematic structural diagram of still yet another user plane integrity protection apparatus according to this application.

FIG. 23 is a schematic structural diagram of still yet another user plane integrity protection apparatus according to this application. Referring to FIG. 23, the user plane integrity protection apparatus 40 may include a receiving module 41, a processing module 42, and a sending module 43.

The receiving module 41 is configured to receive first indication information and a bearer identifier that are sent by a first base station. The first indication information is used to indicate the UE to enable, according to a preset integrity protection algorithm, user plane integrity protection for a bearer corresponding to the bearer identifier. The bearer is used to transmit user plane data that matches first flow matching information corresponding to the bearer.

The processing module 42 is configured to enable, based on the first indication information and according to the preset integrity protection algorithm, user plane integrity protection corresponding to the bearer.

The processing module 42 is further configured to when to-be-sent user plane information matches the first flow matching information, perform integrity protection on the user plane information according to the preset algorithm.

The sending module 43 is configured to send the user plane information on which user plane integrity protection has been performed to the first base station.

Optionally, the receiving module 41 may perform S1102 in the embodiment in FIG. 11, S1202 in the embodiment in FIG. 12, S1303 in the embodiment in FIG. 13, S1407 in the embodiment in FIG. 14A and FIG. 14B, S1504 in the embodiment in FIG. 15, and S1604 in the embodiment in FIG. 16.

Optionally, the processing module 42 may perform S1103 in the embodiment of FIG. 11, S1203 in the embodiment of FIG. 12, S1304 in the embodiment in FIG. 13, S1408 in the embodiment of FIG. 14A and FIG. 14B, S1505 in the embodiment in FIG. 15, and S1605 in the embodiment in FIG. 16.

The user plane integrity protection apparatus provided in this embodiment of the present disclosure may perform the technical solutions shown in the foregoing method embodiments. An implementation principle and a beneficial effect of the user plane integrity protection apparatus are similar to those in the method embodiments. Details are not described herein again.

In another possible implementation, the processing module 42 is further configured to when the UE supports user plane integrity protection, enable, based on the first indication information and according to the preset algorithm, user plane integrity protection corresponding to the bearer.

In another possible implementation, the sending module 43 is further configured to after the receiving module 41 receives the first indication information and the identifier of the bearer that are sent by the first base station, send user plane integrity protection information of the UE to the first base station. The user plane integrity protection information is used to indicate whether the UE supports user plane integrity protection.

Optionally, the sending module 43 may perform S1104 in the embodiment in FIG. 11, S1204 in the embodiment in FIG. 12, S1305 in the embodiment in FIG. 13, S1409 in the embodiment in FIG. 14A and FIG. 14B, S1506 in the embodiment in FIG. 15, and S1606 in the embodiment in FIG. 16.

In another possible implementation, the processing module 42 is further configured to before the receiving module 41 receives the first indication information and the identifier of the bearer that are sent by the first base station, when the user plane information to be sent by the UE satisfies a preset policy, request a core network control network element to set up the bearer.

In another possible implementation, the preset policy is generated by the UE when the UE obtains an IP address of a domain name server.

In another possible implementation, the preset policy is used to indicate that the user plane information to be sent by the UE is a DNS message.

In another possible implementation, the receiving module 41 is further configured to receive the first indication information, the identifier of the bearer, and a NAS message that are sent by the first base station. The NAS message includes the first flow matching information.

In another possible implementation, the first flow matching information is a flow filter template in which a target IP address is a preset IP address.

In another possible implementation, the preset algorithm is the same as a control plane integrity protection algorithm of the first base station and the UE.

The user plane integrity protection apparatus provided in this embodiment of the present disclosure may perform the technical solutions shown in the foregoing method embodiments. An implementation principle and a beneficial effect of the user plane integrity protection apparatus are similar to those in the method embodiments. Details are not described herein again.

Figure 24:
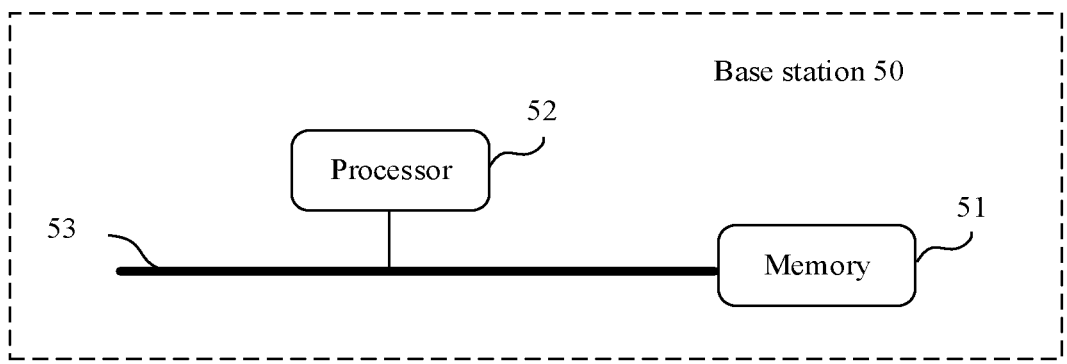
FIG. 24 is a schematic structural diagram of a base station according to this application.

FIG. 24 is a schematic structural diagram of a base station according to this application. Referring to FIG. 24, the base station 50 includes a memory 51 and a processor 52. The memory 51 communicates with the processor 52. For example, the memory 51 communicates with the processor 52 through a communications bus 53. The memory 51 is configured to store a computer program, and the processor 52 executes the computer program to implement the methods shown in the embodiments in FIG. 2 to FIG. 10.

Optionally, the base station may further include a transmitter and/or a receiver.

Figure 25:
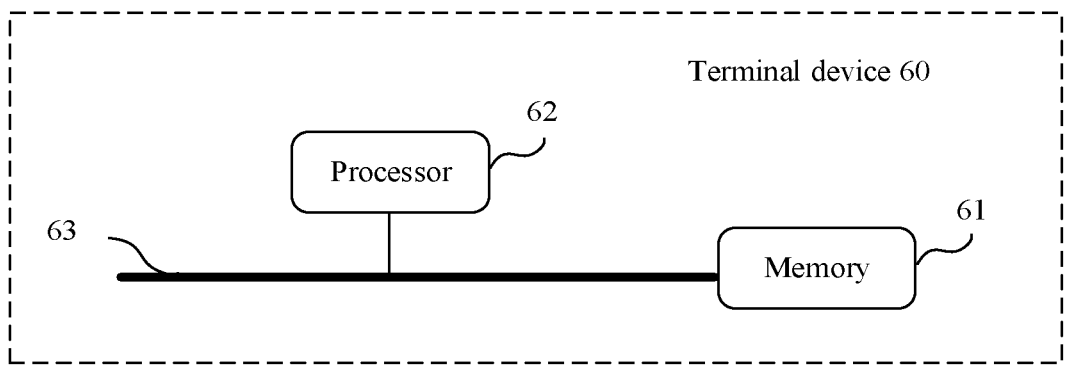
FIG. 25 is a schematic structural diagram of a terminal device according to this application.

FIG. 25 is a schematic structural diagram of a terminal device according to this application. Referring to FIG. 25, the terminal device 60 includes a memory 61 and a processor 62. The memory 61 communicates with the processor 62. For example, the memory 61 communicates with the processor 62 through a communications bus 63. The memory 61 is configured to store a computer program, and the processor 62 executes the computer program to implement the methods shown in the embodiments in FIG. 2 to FIG. 10.

Optionally, the terminal device may further include a transmitter and/or a receiver.

Figure 26:
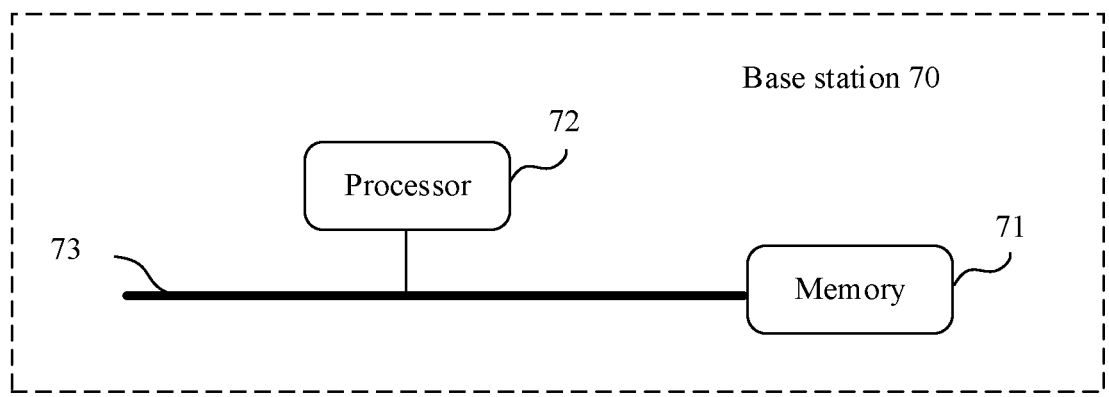
FIG. 26 is a schematic structural diagram of another base station according to this application.

FIG. 26 is a schematic structural diagram of another base station according to this application. Referring to FIG. 26, the base station 70 includes a memory 71 and a processor 72. The memory 71 communicates with the processor 72. For example, the memory 71 communicates with the processor 72 through a communications bus 73. The memory 71 is configured to store a computer program, and the processor 72 executes the computer program to implement the methods shown in the embodiments in FIG. 11 to FIG. 16.

Optionally, the base station may further include a transmitter and/or a receiver.

Figure 27:
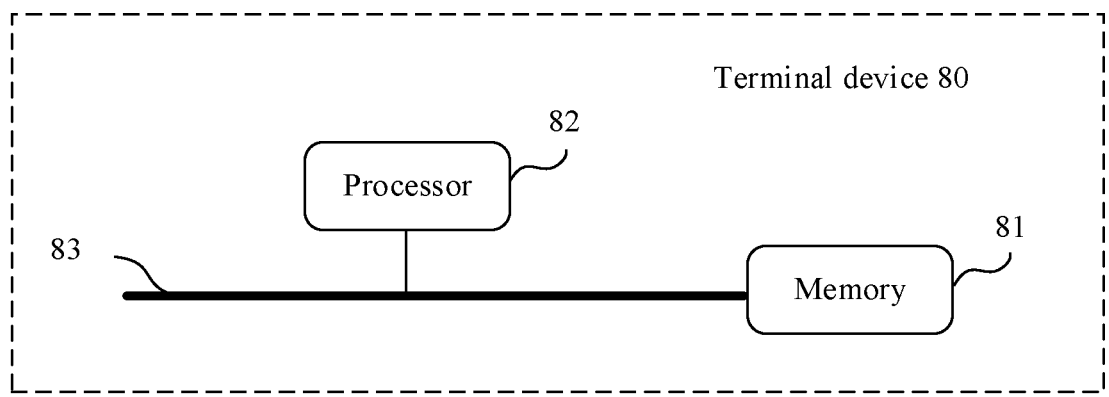
FIG. 27 is a schematic structural diagram of another terminal device according to this application.

FIG. 27 is a schematic structural diagram of another terminal device according to this application. Referring to FIG. 27, the terminal device 80 includes a memory 81 and a processor 82. The memory 81 communicates with the processor 82. For example, the memory 81 communicates with the processor 82 through a communications bus 83. The memory 81 is configured to store a computer program, and the processor 82 executes the computer program to implement the methods shown in FIG. 11 to FIG. 16.

Optionally, the terminal device may further include a transmitter and/or a receiver.

Optionally, the processor may be a central processing unit (CPU), or may be another general-purpose processor, a digital signal processor (DSP), an application-specific integrated circuit (ASIC), or the like. The general-purpose processor may be a microprocessor, any conventional processor, or the like. Steps of the methods disclosed with reference to this application may be directly performed and accomplished by a hardware processor, or may be performed and accomplished by a combination of hardware and a software module in a processor.

This application provides a storage medium. The storage medium is configured to store a computer program, and the computer program is used to implement the method provided in any one of the embodiments in FIG. 2 to FIG. 10.

This application provides a storage medium. The storage medium is configured to store a computer program, and the computer program is used to implement the method provided in any one of the embodiments in FIG. 11 to FIG. 16.

This application provides a chip. The chip is configured to support a base station in implementing a function shown in the embodiments of this application, for example, a function of processing or sending data and/or information in the foregoing method. The chip is further used in a chip system, and the chip system may include a chip. Alternatively, the chip system may include a chip and another discrete device. When a chip in the base station is used to implement the foregoing method, the chip includes a processing unit and a communications unit. The processing unit may be, for example, a processor. The communications unit may be, for example, an input/output interface, a pin, or a circuit. The processing unit performs all or some actions performed by a processing module of the base station in the embodiments of this application. The communications unit may perform actions corresponding to the actions performed by a sending module of the base station in the embodiments of this application. For example, when the sending module of the base station sends a radio frequency signal, the communications unit sends a baseband signal corresponding to the radio frequency signal. In another specific embodiment, the processing module of the base station in this application may be the processing unit of the chip, and the sending module of the base station is the communications unit of the chip.

This application provides a chip. The chip is configured to support UE in implementing a function shown in the embodiments of this application, for example, a function of processing or receiving data and/or information in the foregoing method. The chip is further used in a chip system, and the chip system may include a chip. Alternatively, the chip system may include a chip and another discrete device. When a chip in the UE is used to implement the foregoing method, the chip includes a processing unit and a communications unit. The processing unit may be, for example, a processor. The communications unit may be, for example, an input/output interface, a pin, or a circuit. The processing unit performs all or some actions performed by a processing module of the UE in the embodiments of this application. The communications unit may perform actions corresponding to the actions performed by a receiving module of the UE in the embodiments of this application. For example, when the receiving module of the UE receives a radio frequency signal, the communications unit receives a baseband signal corresponding to the radio frequency signal. In another specific embodiment, the processing module of the UE in this application is the processing unit of the chip, and the receiving module of the UE is the communications unit of the chip.

All or some of the steps of the foregoing method embodiments may be implemented by a program instructing related hardware. The foregoing program may be stored in a readable memory. When the program is executed, the steps in the foregoing method embodiments are performed. The foregoing memory (storage medium) includes a read-only memory (ROM), a random-access memory (RAM), a flash memory, a hard disk, a solid-state drive, a magnetic tape, a floppy disk, an optical disc, and any combination thereof

What is claimed is:

1. A method comprising:
   sending, by a user equipment (UE), a non-access stratum (NAS) message to a mobility management entity (MME), wherein the NAS message comprises user plane integrity protection information of the UE and enables the MME to send an initial context request message comprising the user plane integrity protection information to a first base station, wherein the user plane integrity protection information indicates whether the UE supports user plane integrity protection;

receiving, by the UE, first information from the first base station, wherein the first information indicates the UE to enable the user plane integrity protection; and enabling the user plane integrity protection according to a preset integrity protection algorithm when the UE supports the user plane integrity protection.

2. The method of claim 1, wherein the preset integrity protection algorithm is the same as a control plane integrity protection algorithm of the first base station and the UE.

3. The method of claim 1, wherein receiving the first information from the first base station comprises receiving, from the first base station, an access stratum security mode command message comprising the first information.

4. The method of claim 1, further comprising sending, after enabling the user plane integrity protection, an access stratum security mode complete message to the first base station.

5. The method of claim 1, wherein the NAS message indicates the MME to send the initial context request message comprises sending, to a second base station, a Radio Resource Control (RRC) connection setup message comprising the user plane integrity protection information, wherein the RRC connection setup message instructs the second base station to send a base station addition request message comprising the user plane integrity protection information to the first base station, wherein the first base station is a secondary base station coupled to the UE, and wherein the second base station is a master base station coupled to the UE.

6. The method of claim 5, wherein receiving the first information from the first base station comprises receiving, from the second base station, an RRC connection reconfiguration message after the second base station receives a base station addition request response message from the first base station, wherein the RRC connection reconfiguration message comprises the first information, and wherein the base station addition request response message comprises the first information.

7. The method of claim 1, wherein the NAS message enables the MME to send the initial context request message to a third base station, wherein the third base station is configured to send a handover request message comprising the user plane integrity protection information to the first base station before the UE is handed over from the third base station to the first base station.

8. The method of claim 7, wherein receiving the first information from the first base station further comprises receiving, from the third base station, a Radio Resource Control (RRC) connection reconfiguration message comprising the first information after the third base station receives a handover response message from the first base station, and wherein the handover response message comprises the first information.

9. An apparatus comprising:
a transmitter configured to send a non-access stratum (NAS) message to a mobility management entity (MME), wherein the NAS message comprises user plane integrity protection information of a user equipment (UE) and enables the MME to send an initial context request message comprising the user plane integrity protection information to a first base station, wherein the user plane integrity protection information indicates whether the UE supports user plane integrity protection;

a receiver configured to receive first information from the first base station, wherein the first information indicates the UE to enable the user plane integrity protection; and a processor coupled to the transmitter and the receiver, wherein the process is configured to enable the user plane integrity protection according to a preset integrity protection algorithm when the UE supports the user plane integrity protection.

10. The apparatus of claim 9, wherein the receiver is further configured to receive, from the first base station, an access stratum security mode command message comprising the first information.

11. The apparatus of claim 9, wherein the transmitter is further configured to send, after the processor enables the user plane integrity protection, an access stratum security mode complete message to the first base station.

12. The apparatus of claim 9, wherein the receiver is further configured to receive, from the first base station, a Radio Resource Control (RRC) connection reconfiguration message after the processor enables the user plane integrity protection according to the preset integrity protection algorithm, wherein the RRC connection reconfiguration message comprises first indication information indicating the UE to not enable the user plane integrity protection, and wherein the processor is further configured to disable the user plane integrity protection based on the first indication information.

13. The apparatus of claim 9, wherein the processor is further configured to:
negotiate between the first base station and the UE; and
enable, when both the first base station and the UE support user plane integrity protection, the UE user plane integrity protection according to a same user plane integrity protection algorithm based on the first information.

14. The method of claim 1, wherein before enabling the user plane integrity protection according to the preset integrity protection algorithm, the method further comprises negotiating between the first base station and the UE and when both the first base station and the UE support user plane integrity protection, the base station and the UE enable user plane integrity protection according to a same user plane integrity protection algorithm based on the first information.

15. The apparatus of claim 9, wherein the preset integrity protection algorithm is the same as a control plane integrity protection algorithm of the first base station and the UE.

16. The apparatus of claim 9, wherein the receiver is further configured to receive, from the first base station, an identifier of a bearer between the UE and the first base station, wherein the bearer is configured to transmit user plane data that matches first flow matching information corresponding to the bearer.

17. The apparatus of claim 16, wherein the first flow matching information is a flow filter template comprising a preset Internet Protocol (IP) address as a target IP address.

18. The apparatus of claim 9, wherein the transmitter is further configured to send, in parallel with the processor enabling the user plane integrity protection, an access stratum security mode complete message to the first base station.

19. The method of claim 1, further comprising sending, in parallel with enabling the user plane integrity protection, an access stratum security mode complete message to the first base station.

20. The method of claim 1, further comprising receiving, by the UE and from the first base station, an identifier of a bearer between the UE and the first base station, wherein the bearer is configured to transmit user plane data that matches first flow matching information corresponding to the bearer.

* * * * *